US010855604B2

(12) United States Patent
Tigli

(10) Patent No.: US 10,855,604 B2
(45) Date of Patent: Dec. 1, 2020

(54) SYSTEMS AND METHODS OF DATA FLOW CLASSIFICATION

(71) Applicant: Xaxar Inc., San Diego, CA (US)

(72) Inventor: Hus Tigli, San Diego, CA (US)

(73) Assignee: XAXAR INC., San Diego, CA (US)

(*) Notice: Subject to any disclaimer, the term of this patent is extended or adjusted under 35 U.S.C. 154(b) by 0 days.

(21) Appl. No.: 16/694,117

(22) Filed: Nov. 25, 2019

(65) Prior Publication Data

US 2020/0169509 A1 May 28, 2020

Related U.S. Application Data

(60) Provisional application No. 62/771,635, filed on Nov. 27, 2018.

(51) Int. Cl.
*H04L 12/851* (2013.01)
*H04L 12/801* (2013.01)
(Continued)

(52) U.S. Cl.
CPC ........ *H04L 47/2441* (2013.01); *H04L 47/193* (2013.01); *H04L 47/196* (2013.01);
(Continued)

(58) Field of Classification Search
CPC . H04L 41/0893; H04L 41/145; H04L 41/147; H04L 43/022; H04L 43/026;
(Continued)

(56) References Cited

U.S. PATENT DOCUMENTS 6,633,540 B1 * 10/2003 Raisanen ................ H04L 47/10 370/230.1
8,682,812 B1 * 3/2014 Ranjan ................ H04L 63/1425 706/12

(Continued)

FOREIGN PATENT DOCUMENTS

EP 2 584 496 A1 4/2013
EP 2584496 A1 * 4/2013 ........... G06K 9/6267

OTHER PUBLICATIONS

Invitation to Pay Additional Fees in International Application No. PCT/US2019/063050, mail date Feb. 4, 2020.

(Continued)

*Primary Examiner* — Un C Cho
*Assistant Examiner* — Shah M Rahman
(74) *Attorney, Agent, or Firm* — Knobbe, Martens, Olson & Bear LLP

(57) ABSTRACT

Systems and methods of classifying data flows being communicated on a network by one or more network elements. One method includes creating a table including information of packet timestamps and pre-defined packet header fields, grouping packets into data flows based on information in the table, assigning flow identifiers to each data flow, determining a plurality of feature/characteristic sets having one or more features and/or one or more characteristics of the data flows, determining one or more classifiers to predict flow labels using the plurality of feature/characteristic sets, and generating a classification policy that includes the one or more classifiers to classify data flows on the network. The method can also include storing the classification policy in at least one non-transitory computer medium that is accessible by a network element that is classifying data flows on the network, and using the classification policy to classify data flows.

20 Claims, 17 Drawing Sheets

(51) Int. Cl.
*H04L 12/857* (2013.01)
*H04L 29/06* (2006.01)

(52) U.S. Cl.
CPC ...... *H04L 47/2408* (2013.01); *H04L 47/2483* (2013.01); *H04L 47/2491* (2013.01); *H04L 69/22* (2013.01)

(58) Field of Classification Search
CPC ..... H04L 43/50; H04L 45/302; H04L 47/193; H04L 47/196; H04L 47/2408; H04L 47/2441; H04L 47/2483; H04L 47/2491; H04L 69/22
See application file for complete search history.

(56) References Cited

U.S. PATENT DOCUMENTS 9,124,515 B2 * 9/2015 Curtis ..................... H04L 69/16
9,762,471 B2 9/2017 Vicat-Blanc et al.
9,967,188 B2 5/2018 Kanonakis et al.
10,462,060 B2 10/2019 Ruthstein et al.
10,484,301 B1 * 11/2019 Shukla ................ H04L 41/0896
2002/0186660 A1 * 12/2002 Bahadiroglu ........... H04L 29/06 370/248
2004/0008627 A1 * 1/2004 Garg ..................... H04L 47/824 370/235
2008/0126556 A1 * 5/2008 Perng .................... H04L 65/607 709/231
2010/0153316 A1 * 6/2010 Duffield .............. H04L 63/1416 706/12
2011/0019574 A1 * 1/2011 Malomsoky ........ H04L 47/2441 370/252
2014/0090058 A1 * 3/2014 Ward .................. H04L 63/1433 726/23
2014/0321290 A1 * 10/2014 Jin ...................... H04L 47/2441 370/241
2014/0334304 A1 * 11/2014 Zang ................... H04L 47/2441 370/235
2015/0071072 A1 * 3/2015 Ratzin ..................... G06F 9/455 370/235
2016/0283859 A1 * 9/2016 Fenoglio ................. H04L 43/50
2016/0301601 A1 * 10/2016 Anand .................... H04L 69/22
2017/0330107 A1 * 11/2017 Gonzalez Sanchez ...................... H04L 43/026
2017/0364794 A1 * 12/2017 Mahkonen ............. H04L 43/10
2018/0189677 A1 * 7/2018 Anderson ........... H04L 63/1408
2018/0219896 A1 * 8/2018 Kokko ................ H04L 63/1433
2019/0279113 A1 * 9/2019 Liu ........................ G06N 20/00
2019/0294995 A1 * 9/2019 Pastor Perales ...... H04L 43/067
2020/0120131 A1 * 4/2020 Soni ....................... G06N 20/00

OTHER PUBLICATIONS

International Search Report and Written Opinion in International Application No. PCT/US2019/063050, dated Mar. 26, 2020.

Written Opinion in International Application No. PCT/US2019/063050, dated Jul. 7, 2020.

* cited by examiner

| PACKET | TIME | SOURCE IP | DEST IP | PROTOCOL | SOURCE PORT | DEST PORT | LENGTH |
|---|---|---|---|---|---|---|---|
| 100 | 87.214.975 | 10.0.2.15 | 65.55.25.50 | TCP | 2526 | 1863 | 566 |
| 101 | 87.215.788 | 72.14.213.147 | 192.168.3.131 | TCP | 443 | 52151 | 1484 |
| 102 | 87.216.748 | 10.0.2.15 | 65.55.25.50 | TCP | 2526 | 1863 | 1233 |
| 103 | 87.217.345 | 10.0.2.15 | 65.55.25.50 | TCP | 2526 | 1863 | 933 |
| 104 | 87.218.123 | 10.0.2.15 | 65.55.25.50 | TCP | 2526 | 1863 | 345 |
| 105 | 87.219.580 | 72.14.213.147 | 192.168.3.131 | TCP | 443 | 52151 | 476 |
| ... | ... | ... | ... | ... | ... | ... | ... |

Figure 4A

| PACKET | FLOW ID |
|---|---|
| 100 | 1 |
| 101 | 2 |
| 102 | 1 |
| 103 | 1 |
| 104 | 1 |
| 105 | 2 |
| ... | |

Figure 4B

| Best Classifier: | Accuracy: | Accuracy when pattern changes to: | |
|---|---|---|---|
| for traffic Type 1<br>"C" | 85.5% | traffic Type 2<br>83.1% | traffic type 3<br>97.8% |
| for traffic Type 2<br>"B" | 83.3% | traffic Type 1<br>84.8% | traffic Type 3<br>84.4% |
| for traffic Type 3<br>"A" | 99.9% | traffic Type 1<br>76.8% | traffic Type 2<br>71.3% |

Figure 15

SYSTEMS AND METHODS OF DATA FLOW CLASSIFICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 62/771,635 filed Nov. 27, 2018, titled "DATA CENTER DATA FLOW CLASSIFICATION VIA MACHINE LEARNING" which is incorporated by reference herein in its entirety.

BACKGROUND OF THE INVENTION

Field of the Invention

This invention relates to transmission of digital information over a communications network. More particularly, this invention relates to characterization of data traffic flows in a network in real-time or near real-time.

Description of the Related Art

Over seventy percent of all Internet information traffic takes place inside data centers. Data center networks (DCNs) are comprised of hundreds to hundreds or thousands of host machines (servers), exchanging data via network switches and routers over many data links. To meet different priority requirements while at the same time using network resources efficiently, it is desirable to have sophisticated traffic engineering systems and methods. In a typical data center network, a small percentage of data flows consume a large majority of bandwidth and therefore has the greatest impact on performance of the network. As a result, efforts are made to deal with this situation to assure efficient operation of the data centers. Generally, these efforts involve identifying these large data flows which are sometimes referred to as "elephant flows" or "heavy-hitter flows" or "long flows" or by similar names and treating these flows differently than other flows in the data center which are sometimes referred to as "mice flows" or "short flows." A majority of the "long" or "elephant" flows also each have a large number of bytes (payload) and therefore long/elephant can also be interpreted as being a "heavy" data flow (i.e., having a heavy payload). Many other networks (not just data center networks) may also handle data traffic with similar characteristics as described above.

Currently, most data traffic management methods are either too high-level and rigid, or too granular and complicated. High-level and rigid methods include service level agreement (SLA) driven quality of service (QoS) labels in the packet headers or other deterministic priorities tied, for example, to a specific application running on the network. Too granular and complicated methods include such data center protocols as equal-cost multi-path (ECMP) protocols, where routing decisions are made on each packet by mapping multiple data links with the same number of hops from source to destination and routing the packet along those multiple "equal cost" paths, or managing the buffers on network devices so that the "right mix" of traffic resides in the buffers and other traffic is excluded or discarded from the buffers.

What is needed is a better system and method to provide substantially real time data flow identification and classification via machine learning in data centers and other networks.

SUMMARY OF THE INVENTION

The disclosed embodiments can provide a network element or network elements in a data center, or in other network, a predetermined classification policy that can include systems, processes and software to classify data flows as they are being transmitted through a network. For example, classifying data flows in real-time or near real-time as elephant flows and mice flows inside data centers or other networks, so that those elephant flows or mice flows can be subjected to special handling to improve the flow of all data in the data center.

One innovation includes a method of classifying data flows, being communicated on a network, by one or more network element(s). The method includes receiving a plurality of packets from the network, each packet having header information; segregating the plurality of packets into a plurality of data flows based at least in part on the respective header information of each packet. The method also includes, for each data flow: selecting a subset of the packets in the respective data flow; classifying the data flow as one of at least two categories of data flows using one or more parameters determined from the subset of packets and using a predetermined classification policy for classifying data flows, said classification policy including one or more classifiers each defined using parameters determined from packets in a plurality of sample data flows, the sample data flows being previously transmitted on the network; and routing the data flow in the network based on its respective classification.

Such methods are further characterized by, or such methods can further include, a number of aspects (features or limitations) which are disclosed in summary below and/or discussed herein. In an aspect, the number of sample data flows is greater than one thousand data flows, or can be greater than ten thousand data flows, or greater than one hundred thousand data flows. The method can further include storing the predetermined classification policy on the network element. The method can further include generating the predetermined classification policy. In an aspect, generating the predetermined classification policy can include (i) obtaining samples of packets previously transmitted on the network; (ii) grouping the samples of packets into data flows; (iii) separating the data flows into training data and test data; (iv) determining one or more parameters from the training data; (v) training one or more classifiers using one or more parameters of the training data; (vii) testing the one or more classifiers using the test data to determine an accuracy of each classifier; (viii) determining if each classifier is accurate, and in response to determining a classifier is not accurate, repeating parts (v)-(vi) of the method; and providing the classification policy including the one or more classifiers to the network element.

In an aspect, the one or more parameters includes one of more features, each feature being a time-independent feature determined using respective packet information in a data flow. In an aspect, the one or more features include at least one or the following: frame number, protocol, source IP address, destination IP address, source port number, destination port number, sequence number, quality of service (QoS), a flag indicting whether packet can be fragmented, flag indicting whether one of more fragments follow, position of fragment in original packet, a flag indicating whether both TCP and UDP fields are set, or a type of service (ToS) flag to specify Quality of Service levels. In an aspect, the one or more parameters includes one of more characteristics. In an aspect, the one or more characteristics includes time-based characteristics that are calculated using respective packet information in a data flow. In an aspect, wherein the one or more characteristics include at least one of the following: flow ID, channel ID, sub-channel ID, packet position number in the flow, time since last frame in this flow, time since first frame in this flow, average time for this flow, average time difference, cumulative packet size in this flow, average packet size in this flow, or flow rate. In some implementations, the predetermined classification policy can include one or more classifiers. For example, in various implementations, a predetermined classification policy can include at least two classifiers, at least three classifiers, or at least four classifiers (or more than four classifiers).

In some implementations, the method further includes selecting one of the at least two classifiers to classify data flows based on an input received by the network element. In some implementations, the input is based on a pre-set traffic engineering policy. In some implementations, the pre-set engineering policy dictates the use of a certain classifier based on the time of day or day of the week. The method can further include performing one or more network actions based on the classification of the data flows. For example, the one or more network actions can include assigning real-time quality of service (QoS) to some or all flows, routing data flows to different channels, input to flow tables (SDN), routing long data flows to dedicated links, routing long data flows to a photonic layer, routing data flows to P2P wireless networks, adjusting buffer settings, managing streaming parameters, managing compression, and/or providing input to data flow traffic engineering. In various implementations of the method, segregating the plurality of packets into a plurality of data flows includes assigning packets having the same 5-tuple data in their header into the same data flow. In various implementations of the method segregating the plurality of packets into a plurality of data flows includes separating packets into different data flows based at least in part on a predetermined time between two packets that have the same 5-tuple data.

Another innovation includes a method of classifying data flows being communicated on a network by one or more network element(s), the method including creating, from a plurality of sample packets, a table including information of packet timestamps and pre-defined packet header fields, the plurality of sample packets being previously transmitted on the network; grouping the plurality of sample packets into data flows based at least in part on information in the table; assigning flow identifiers to each of the data flows; grouping the data flows into a training portion and a testing portion; determining one or more parameters having one or more features and/or one or more characteristics of the training data flows; determining a classifier to predict flow labels, including iteratively training and testing the classifier, using the training portion and the one or more parameters to train each classifier, and the testing portion to determine an accuracy of the classifier; generating a classification policy that includes the classifier to classify data flows on the network; and providing the classification policy to be used by a network element to classify data flows. Such methods can further include any of the features, aspects and limitations discussed above.

In another innovation, a method of classifying data flows, being communicated on a network, by one or more network element(s) includes (i) obtaining samples of packets from the network, (ii) grouping the samples of packets into data flows, (iii) separating the data flows into training data and test data, (iv) training one or more classifiers to classify data flows using one or more parameters of the training data and the training data as ground truth, (v) determining accuracy or the one or more classifiers using the test data, (vi) in response to determining a classifier is not accurate, repeating portions (iv)-(v) of the method, and (vi) providing the classification policy including the one or more classifiers to be used to classify data flows on the network. The method can further include storing the classification policy in at least one non-transitory computer medium that is accessible by the network element that is classifying data flows on the network. Any of the methods disclosed herein can include for generating a classifier in a classification policy (i) determining an initial set of parameters including a plurality of features and a plurality of characteristics from the training data; (ii) using a selected classifier model and the initial set of parameters for respective data flows in the training data, classify the data flows in the training data to one of at least two categories of data flows and determine the accuracy of the classifications of the respective data flows using the test data; (iii) generating one or more revised sets of parameters by changing one or more of the features and characteristics of the initial set of parameters; (iv) using the selected classifier and the plurality of revised sets of parameters for respective data flows in the training data, classify the data flows in the training data to one of at least two categories of data flows and determine the respective accuracy of the classifier for classifying the data flows in the test data using each revised set of parameters; (v) repeating steps (iii) and (iv) until a final set of parameters is determined for the selected classifier that meets an accuracy value, the final set of parameter being at least one of the revised sets of parameters; and (vii) including the selected classifier and the final set of parameters in the classification policy. In some implementations, the accuracy value is a predetermined accuracy value. In some implementations, the accuracy value is the highest accuracy value achieved using the selected classifier and the test data.

Another innovation is a system that performs any of the methods described herein. One example system is for generating a classification policy to classify data flows being transmitted (communicated) on a network. The classification policy can be used by a network element. The system includes one or more non-transitory computer storage mediums configured to store at least samples of packets that were previously transmitted on the network, and to store computer-executable instructions. The system also includes one or more computer hardware processors in communication with the one or more non-transitory computer storage mediums, the one or more computer hardware processors configured to execute the computer-executable instructions to at least (i) group the samples of packets into data flows; (ii) separate the data flows into training data and test data; (iii) train one or more classifiers to classify data flows using one or more parameters of the training data and the training data as ground truth; (iv) determine accuracy or the one or more classifiers using the test data, (v) in response to determining a classifier is not accurate (or further optimization is desired), repeat portions (iii)-(iv). The system can also be configured to provide the classification policy, including the one or more classifiers, to another system (a data center, one or more network elements) to classify data flows on the network using the classification policy. A network element can classify data flows on a network using the predetermined classification policy. Importantly, the one or more classifiers are defined (trained) using samples of packets that were previously transmitted on the same network that subsequently uses the classification policy (e.g., transmitted on the network hours, days, weeks or months beforehand). Such systems can further perform one or more network actions based on the classification of the data flows and the predetermined classification policy. One or more other network actions described below, and any combinations thereof, can also be performed. Such one or more network actions include assigning real-time quality of service (QoS) to some or all of the flows (for example, short flows can be given a higher QoS, i.e., as the packet is forwarded to its destination, the QoS field is re-written or written for the first time, if QoS field was blank) for higher priority; routing data flows to different channels (for example, long flows may be router through higher-speed ports), input to flow tables (SDN), routing long data flows to dedicated links (for example, dedicated high-speed links), routing long data flows to photonic layer (for example, to high-speed photonic switches), and routing data flows to P2P wireless networks (for example, a high-speed point-to-point wireless link inside the data center).

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims). The classification policy can be included on server system, or can be included on an application-specific integrated circuit (ASIC) or other integrated circuit chips that are customized to include data flow processing and classifying, and such ASIC's or other integrated circuit chips can be included in a network or network element.

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above-described and/or below-described embodiments (including one or more aspects of the appended claims).

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 4A is a table illustrating a portion of a "packet capture" file, showing packet numbers and information relating to the packets, including the 5-tuple data of the packets.

FIG. 4B is a table illustrating an example of the packets being assigned to individual flows.

FIG. 15 illustrates an example of different classification accuracies for different algorithms based on the data traffic type, according to some embodiments.

DETAILED DESCRIPTION OF CERTAIN INVENTIVE ASPECTS

Figure 1A:
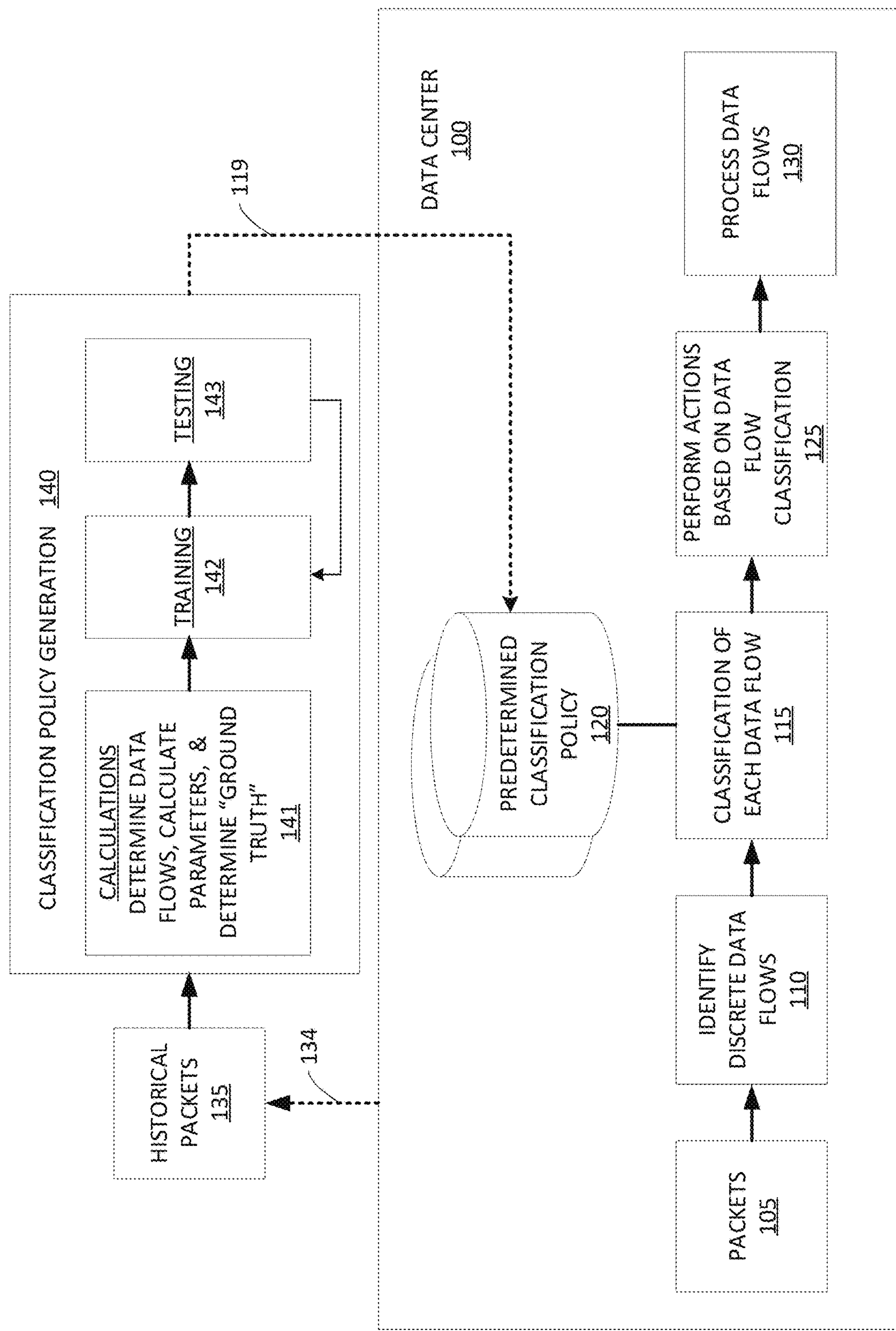
FIG. 1A illustrates an overview of receiving and processing packets in a data network (or network element), according to some embodiments.

The detailed description of various exemplary embodiments below, in relation to the drawings, is intended as a description of various aspects of the various exemplary embodiments of the present invention and is not intended to represent the only aspects in which the various exemplary embodiments described herein may be practiced. The detailed description includes specific details for the purpose of providing a thorough understanding of the various exemplary embodiments of the present invention. However, it will be apparent to those skilled in the art that some aspects of the various exemplary embodiments of the present invention may be practiced without these specific details. In some instances, well-known structures and components are shown in block diagram form in order to avoid obscuring various examples of various embodiments.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Although particular aspects various exemplary embodiments are described herein, numerous variations, combinations and permutations of these aspects fall within the scope of the disclosure. Although some benefits and advantages of certain aspects are mentioned, the scope of the disclosure is not intended to be limited to particular benefits, uses or objectives.

Overview

As indicated above, there are major shortcomings in data traffic management processes and systems which manage data flows using high-level rigid approaches, or finely granular and complicated approaches, because the type of data traffic exchanged at any point in time between a pair of servers, or a set of servers, can vary greatly. For example, during network communications for a web search request, or a portion of an online purchase transaction, data transfers will typically be very short and involve few Internet Protocol (IP) packets (or "packets"). At the other extreme, network communications for a backup application can involve large amounts of data in many packets, and data transfers from a source computer (or "source") to a destination computer (or "destination") can take a relatively large amount of time. In some examples, short transfers of packets might last nanoseconds to milliseconds, whereas long transfers of packets can last hundreds of milliseconds to minutes or hours.

Rigid and deterministic processes for handling data transfers by a network (e.g., a network element) fall short when data workloads and/or traffic characteristics change dynamically and unpredictably. At the other extreme, fine granular methods might create network congestion when, for example, long and large data transfers are routed along multiple data links, clogging those links for time-sensitive data traffic, such as quick e-commerce transactions. For these reasons, new traffic engineering approaches have been developed, whereby data traffic is managed by data flows in the network. A data flow is defined as a series of packets in sequence, with a set of same packet header characteristics. A traditional definition of a data flow is the set of IP packets with the same source port, destination port, source IP address, destination IP address, and the type of transfer protocol. The individual elements of the packet header are referred to as fields and the above five fields of the packet header are referred to as the "5-tuple" header information. Version 4 of IP (IPv4) headers and the later IPv6 both have 14 fields, five of which make up the 5-tuple header information. Various flow identification and classification methods have been proposed. For example, the number of bytes in successive packets in a data flow on a network can be added up (e.g., by a network element) and declared to be a long flow if a certain threshold is reached, in terms of cumulative number of bytes; in this example, the data flow is processed as a short flow unless it is declared to be a long flow. See for example, U.S. Pat. No. 9,124,515 which is incorporated herein by reference.

In embodiments described herein, a pre-determined classification policy ("classification policy") is generated which can be used to categorize data flows into a set of categories; for example, two or more categories. In some examples, the data flows are categorized into either mice flows or elephant flows using the classification policy. In some examples, the data flows are categorized into three or more different categories of flows; for example, short flows, medium-short flows, and long flows. In another example, the data flows are categorized into four categories using the classification policy; for example, short flows, medium-short flows, long flows, and very long flows. In some implementations, categorization of data flows into more than four flows is also possible. Accordingly, although many of the examples herein refer to classifying data flows into two categories (e.g., mice and elephant flows), various embodiments can classify data flows into more than two categories The definition of what is a particular type of flow may depend on various factors; for example, the particular data flows being processed, or the network (or network element) processing the data flows. In an example, a data flow can be classified as a long flow if it is greater than 100 ms. In another example, a data flow can be classified as a long flow if it is greater than 200 ms. In another example, a data flow can be classified as a long flow if it is greater than one second. In an example where data flows are categorized into more than two categories, a data flow that is less than 100 ms can be classified as a short data flow, a data flow that is 100 ms to less than 200 ms can be classified as a medium data flow. A data flow that is 200 ms to less than one second can be classified as a long flow, in a data flow that is greater than 1 second can be classified as a very long flow. In some implementations of using a classification policy, the criteria for classifying a data flow to be a certain category is predetermined by a user. In some implementations of using a classification policy, the criteria for what makes a data flow a certain category is dynamically set, or is set based on a one or more conditions of a network or of a data flow processing system.

As used herein, a predetermined classification policy (sometimes for brevity referred to as a "classification policy") refers to a process that has been previously generated to classify data flows on a network or a network element (both referred to herein as a "network" for ease of reference), where the process is determined using samples of data flows that were communicated on the network. For example, by using thousands, tens of thousands, or hundreds of thousands of data flows from a particular network to generate a classification policy for that particular network. Because different networks can handle significantly different types of data traffic and correspondingly can have significantly different types of data flows, defining a classification policy for a network using data flows communicated on that network will most likely result in the highest accuracy in classifying data flows on that network. However, if a first network handles packet traffic flow similar to a second network, a classification policy generated using data flow samples from the first network can be implemented on the second network, and the higher the similarity of data traffic patterns in the first and second network the higher the data flow classification accuracy is likely to be.

A classification policy can include one or more "classifiers." Each classifier can be a model-based process or algorithm that has been generated/trained/defined/refined to classify data flows into a set of categories. Different classifiers can work differently on data flows that comprise is different ratio of long and short flows, so it can be beneficial to train more than one classifier on any given sample of data to determine which classifier is best for that particular type of data. "Training" (or defining) a classifier generally refers to defining the classifier to classify date flows accurately. For example, training the classifier to achieve a desired accuracy level when classifying data flows of a certain type of data (e.g., data that has a certain ratio of long and short flows). Different classifier goals may be based on a particular implementation on a network element. For example, training a classifier to achieve the highest accuracy when classifying data flows such that the processing is performed within a certain time limit, training a classifier to achieve the highest accuracy possible using a small number (or the smallest number) of parameters, training a classifier to use only a subset of the packets in a data flow (e.g., the smallest number of packets) to make the accurate classification of the data flow. As there are numerous parameters that may be useful to determine and evaluate to classify a data flow, the training determines which are the best one or more parameters to use to classify data flows. For example, which parameters have the most influence on determining an accurate classification of a data flow. As an example, an ideal classifier could use one parameter that can be determined (e.g., read) from one packet of a data flow to accurately classify that data flow. However, due at least in part to the variety of data traffic on different networks, currently no such "one" parameter exists. Accordingly, one or more parameters may have to be used, and a parameter may have to be calculated from more than one packet from a data flow. Thus, determination of a classification policy may include selecting one of possibly several classifiers to use, and determining which of one or more parameters to use. Determination of the classification policy may also include evaluating different parameters and/or classifiers based on their accuracy when using a certain number of packets to make the classification (the lower the better if sufficient accuracy can still be achieved).

As an example, a classifier can implement a decision tree-based model, which is a well-known model that can be represented by a flowchart like diagram that shows the various outcomes from a series of decisions. As another example, a classifier can implement a k-nearest neighbor-based (k-NN) model. A k-NN model (or algorithm) which a non-parametric method used for classification of data. As another example, a classifier can implement a random forest-based model, which is another well-known classification model that implements different decision trees to predict the final class of a test object. Other classifiers such as neural networks or SVM (support vector machine) can also be used, as one skilled in the art will appreciate. A classifier can utilize machine-learning techniques that train the classifier iteratively through processing many sample data flows. Training of a classifier can include using sample data flows using a variety of different parameters, and using a varying number of packets in each sample data flow. A classification policy that includes two or more classifiers can be controlled to use one of the two or more classifiers in any particular instance, and be controlled to switch from using one of the classifiers to using another one of the classifiers based on an input received by a network element classifying data flows, or by a condition the network element determines. For example, a classifier may be selected based on a current network condition that is determined to be occurring. In another example, a classifier may be selected based on one or more other criteria, for example, time of day or day of the week (e.g., to classify network traffic differently during times when large backup operations are more likely to be occurring).

Generating a classification policy can include determining, for each classifier in the classification policy, determining certain parameters to use for classifying data flows, training the classifier to classify data flows using one or more of the parameters and sample data flows, and testing the classifier on other sample data flows. The process for determining parameters, training the classifier using sample data, and testing the classifier using other sample data may be generally referred to as "training" a classifier. To train a classifier, copies of actual packet data flows that include flows of a variety of different lengths and/or different payloads that have been transmitted in a network are obtained as sample data flows. The sample data flows are evaluated to determine a variety of parameters ("parameters" being used herein to collectively refer to "features" and/or "characteristics") that characterize the sample data flows. The "type" of each sample data flow is determined (e.g., mice flow, elephant flow; or as being one or three or more types of a flow (e.g., short, medium, long, very long)), thus establishing the sample data flows as "ground truth" that can be used to train and test a classifier, and to evaluate the classifier's accuracy when it is used to classify a particular sample data flow. The features and characteristics used to train the classifiers can include one or more of the features and/or one or more of the characteristics, which are disclosed herein. The features and characteristics used to train the algorithms can also include or one or more other features and/or one or more characteristics other than what are listed herein, and such implementations are within the scope of this invention. For example, features or characteristics can be determined to help classify certain flows that are likely to carry certain amounts of traffic (bytes): for example, flows likely to carry less than or greater than 1 gigabit (or some other threshold). The sample data flows can be separated into two data sets, a training sample data set (a first sample data set) used to train each classifier of a classification policy, and a test sample data set (a second sample data set) used to test each "trained" classifier. For example, the training sample data set may include 80% of the sample data flows and be used to train the classifiers, and the test sample data set may include 20% of the sample data flows and be used to test the classifiers after they have been trained for example, to determine the accuracy of each of the trained classifiers.

The one or more features used for training a classifier (and in operation for classifying data flows) can include information that can be determined directly from the information that is in the header of a packet. The one or more characteristics used for training a classifier (and in operation for classifying data flows) can be calculated from the information in the packet header or other aspects of the packets, such as the time the packet was transmitted, or the time elapsed since the last packet was transmitted in the current flow. Herein such parameters may be referred to as either "features" or "characteristics" for ease of reference, but any such features or characteristics can generally be referred to as "parameters" of ease of reference. As an example, features of a packet that can be used to train a classifier can include one or more of frame number, protocol, source IP address, destination IP address, source port number, destination port number, sequence number, quality of service (QoS), a flag indicting whether packet can be fragmented, flag indicting whether one of more fragments follow, position of fragment in original packet, a flag indicating whether both TCP and UDP fields are set, or a type of service (ToS) flag to specify Quality of Service levels. As an example, characteristics that can be used to train a classifier can include one or more of flow ID, channel ID, sub-channel ID, packet position number in the flow, time since last frame in this flow, time since first frame in this flow, average time for this flow, average time difference, cumulative packet size in this flow, average packet size in this flow, or flow rate (e.g., in number of packets per second).

As an example for training a classifier, all of the parameters are calculated for data flows in the training sample data set, and it is determined for each of the data flows in the training sample data set whether it is a long flow or a short flow. Then using the "truth" of the type of flow of each data flow, and using all of the parameters, the classifier is trained to correctly recognize the type of each data flow in the training sample data set based on the parameters. Using all of the parameters, the accuracy of a classifier could be as high as 100%. However, because some of the parameters are calculated from the data flow and such calculations take a certain amount of time, determining all of the parameters for received data flows is not practical in real-time applications. For example, in general the more parameters that are used to classify data flow the longer it takes to classify the data flow such that there is a trade-off between the number of parameters that are used in the speed of the classification. Also, because some of the parameters are determined by time-based calculations where more than one packet needs to be evaluated to determine the parameter, it can be desirable to minimize the number parameters that require time-based calculations while still achieving acceptable accuracy classification. Accordingly, additional iterations of the evaluating the training sample data set by a classifier are performed to determine a set of parameters, that is less than all of the parameters, they can be used to accurately classify the data flows.

For example, iterations of training a classifier can be performed using various subsets of the 26 parameters identified above, where each iteration has a different combination and/or a different number of parameters. Based on this training, a subset of the parameters that are most likely to yield the highest accuracy for that particular classifier (e.g., a particular classifier model) on a sample data set can be determined. For example, for a particular sample data set it may be determined that using only five parameters are necessary to achieve a particular accuracy (e.g., 95%), and using only three parameters yields an accuracy of 85% but the classifications can be performed faster and require less resources. Based on a particular implementation in the performance goals of the network that will be using the predetermined classification policy, a provided classification policy may include a classifier that uses five of the parameters (and can achieve 95% accuracy), or a classifier that uses three of the parameters (and can achieve 85% accuracy). In some implementation, the classification policy can include both a classifier that uses five and a classifier that uses three of the parameters, and the network can switch between using the different classifiers based on one or more conditions. In training a classifier, the training may determine certain parameters as being the most useful in determining the classification of a data flow. Another factor that is considered in training a classifier is the number of packets of a data flow that it takes to make a classification decision, because evaluating a smaller number of packets in achieving an accurate classification is desirable.

For example, in some instances (e.g., based on the training sample data set and the classifier-model selected) the training may determine that the parameter time since first frame in this flow is the most important parameter in determining the classification of a data flow. In another example, the training may determine that the parameter flow rate is the most important parameter determine the classification of data flow. After one or more classifiers have been trained using the training sample data set, each classifier can be tested using the test sample data set, to test the classifier in classifying data flows that it has not been trained on. The parameters used for a classifier can then be iteratively refined, and additional training and testing performed; for example, to optimize the classifier's accuracy while minimizing the amount of time the classifier takes to classify the data flows. The training and testing of the classifiers are performed "off-line" due to the extensive time required, where thousands of iterations may be performed on many thousands of sample data flows in order to determine, for that particular sample data and for that particular classifier model, the set of parameters that are best used to classify the data flows to achieve an acceptable accuracy for the requirements of the network, and where the classifications are performed within an acceptable amount of time to minimize the impact to network performance for managing data flows. In one example, using a set of parameters for certain sample data, three classifiers are tested at three different thresholds for the duration of elephant flows for three different data sets. After examining only the first two packets in a flow, prediction accuracy of higher than 77% has been shown to be possible. Once an elephant flow has been predicted, traffic engineering actions can be taken, depending on the user, to improve the efficiency and the performance of the data center or other network.

After the parameters for one or more classifiers have been determined, a classification policy that includes the one or more classifiers can be provided to a network element and implemented to classify data flows in the network. For example, the network element can select one of the classifiers in a classification policy stored at the network element, determine the parameters used by the selected classifier in classifying the data flows in real time. In operation, once data packets have been grouped into data flows, the classification policy uses a subset of the packets in the data flow to determine its classification. In an example, the classification policy uses two packets of a data flow to determine its classification. In other examples, the classification policy uses more than two packets of a data flow to determine its classification. That is, a classification policy can use three packets, four packets, five packets, six packets, seven packets, eight packets, nine packets, or ten packets of a data flow determines classification. In some limitations, a classification policy can use more than ten packets of data flow to determine its classification, although generally as few packets as possible are used to minimize network resources for determining the classification (e.g., calculating parameters)

and to minimize the time it takes to classify each data flow. In some examples, where the speed of classification is of utmost importance, the classifier can be programmed to make a classification decision even after the very first packet in a data flow.

In some instances, various actions of the network can be taken based on the classifications determined by the classification policy. In various augmentations, the actions in the network can include one or more of the following: assigning real-time quality of service to certain flows, routing certain flows to different communication channels, providing input to flow tables (SDN), routing long flows or "heavy" flow to dedicated links, routing long or "heavy" flows to photonic layers, routing flows to P2P wireless networks, adjusting buffer settings of certain network elements, managing streaming parameters for the network, or providing input to other traffic engineering programs or systems.

Various embodiments of the present disclosure provide improvements to various technologies and technological fields. For example, as described above, existing data flow classification can be inaccurate, slow, and/or inconsistent, and various embodiments of the disclosure provide significant improvements over such technology. Additionally, various embodiments of the present disclosure for utilizing machine learning models to improve performance of a computer equipment at a communication data center are inextricably tied to computer technology. For example, methods that improve performance of computers at a communication center can include one or more of creating a table of packet time-stamps and predefined packet header fields, grouping packets into flows and assigning flow identifications, calculating flow statistics, assigning a flow classification label to each flow, creating a feature set for training the machine learning models, training the machine learning models to predict flow labels, and using the computer equipment to predict the flow labels and using the predicted flow labels to improve traffic engineering. Such features and others are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient classification of data flows, and performing actions on a network as a result of the data flow classification.

The present invention can be adapted for use in computer facilities that are generally known as data centers or "cloud environments" or, generally "IP networks,"—that is any network that uses the Internet Protocol for transmitting data in packets. Identification and classification of data flows allows traffic to be managed at a more granular level than high-level priorities, but at a less granular level than individual packets. For example, if flows likely to last long and therefore likely to clog up data links can be identified, these flows might be routed differently (such as via special high-speed links). Or, identification of likely long flows might permit the traffic engineering methods to be applied differently for those specific flows. For long flows to be managed differently, they need to be identified real time in networks. This can be difficult, as flow durations may be short, vary greatly and change dynamically. Some long flows can be identified by discovering the application they belong to (such as data mirroring), but such approaches usually require deep packet inspection (DPI), which is resource intensive and usually considered undesirable or even impossible if data payloads are encrypted.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Average Packet Size in Flow: a calculation of the average packet size in a data flow, or at least the packets in a data flow that are being evaluated for average packet size.

Average Time, this Flow: a calculated characteristic indicating the average time duration since the first frame of a particular data flow.

Average Time Difference: a calculated characteristic indicating the average of time differences between frames in this flow and their immediate previous frames that may not be in this flow.

Can Packet be Fragmented: refers to determining whether a Don't Fragment (DF) flag is set in the IP header indicating never perform fragmentation of the packet.

Channel ID: Defines the channel that the flow belongs to.

Cumulative Time to be used in Calculating Average Time, this flow: the cumulative Time Since Immediate Last Frame to be used in calculating Average Time Difference.

Cumulative Packet Size in Flow: a calculated characteristic indicating the cumulative packet size of packets in the flow.

Destination IP Address: a host Internet protocol address a packet is being sent to.

Destination Port Number: the port number on the remote host to which the packet is sent.

DPI: Deep packet inspection is a type of data processing that inspects in detail the data being sent over a computer network, and usually takes action by blocking, re-routing, or logging it accordingly.

Flag Indicating Whether Both TCP and UDP Fields are Set: a flag that can be set to indicate both TCP and UDP protocol is set.

Flow ID: A unique integer assigned to a flow.

Frame Number: a frame is a digital data transmission unit in computer networking and telecommunication. In systems transmitting packets, a frame is a simple container for a single network packet.

Flow Rate: a calculated characteristic determined from the number of packets per second.

Network Element: a network element is a manageable logical entity in a computer network uniting one or more physical devices, and can include processes and/or hardware for processing data flows.

More Fragments flag: specifies whether more fragments are to follow—the more fragments flag in the first packet is set to "1" to indicate more fragments are to follow.

Packet Position Number in Flow: the position of the packet in a data flow, i.e. the number of packets so far in this flow.

Position of Fragment in Original Packet: if the packet was fragmented, the position of a fragment in the original packet.

Protocol: the transport protocol; for example, UDP or TCP.

Quality of Service: Quality of service (QoS) is a description or measurement of the overall performance of a service (e.g., a network) particularly the performance seen by the users of the network. For example, short flows can be given a higher QoS. In the network, packet frame headers may contain numbers indicating a higher or lower priority to be given to the packet when forwarding to the next destination. In some instances, the QoS is determined by customer agreements or by traffic engineering.

SDN: Software-defined networking technology is an approach to network management that enables dynamic, programmatically efficient network configuration in order to improve network performance and monitoring.

Source IP Address: an IP address from which a packet is sent.

Source Port Number: the port number on the source host from which a packet is sent.

Sequence Number: the sequence number identifies the order of the packets sent from each computer so that the data can be reconstructed in order, regardless of any packet reordering or packet loss that may occur during transmission.

Sub-Channel ID: Flow number that indicates the order of this flow among the rest of the flows in this Channel ID.

Time Since First Frame in this Flow: a calculated characteristic for the time that has passed since the first frame in a particular flow.

Time Since Immediate Last Frame: a calculated characteristic for the time that has passed since the immediate last frame that does not have to be in this flow.

Time Since Last Frame in this Flow: a calculated characteristic for the time that has passed since the last frame in a flow.

ToS "type of service" Flag to Specify Any QoS Levels: The Type of Service (ToS) bits are a set of four-bit flags in the IP packet header. When any one of these bit flags is set, routers may handle the packet differently than packets with no TOS bits set.

Illustrative Example of a Data Flow Classifier

Described below is an illustrative example of embodiments of systems and methods of a data flow classifier. Other examples of such data flow classifier using some, or all, of the described technology, or additional technology with the described technology, are also possible.

FIG. 1A illustrates an overview of a system that uses a predetermined classification policy to classify data flows on a network and perform actions based on the data flow classification, where the predetermined policy is generated based on packets previously received on that particular network. Further details of the operations illustrated in FIG. 1A are described in further detail herein.

Packets 105 are transmitted on a network of a data center 100. The packets 105 represent a variety of communications that relate to, for example, online retail, searches, interactive video, backups, migration, downloads, interactive video, and the like. At block 110 the data center 100 identifies discrete data flows from the plurality of packets. For example, discrete data flows can be determined by grouping packets having the same 5-tuple packet header information into a data flow, as illustrated in FIGS. 4A and 4B.

At block 115 the data center 100 classifies each data flow using a predetermined classification policy 120. In some implementations, a network element classifies each data flow using a stored predetermined classification policy that the network element has access to, for example, stored in a non-transitory memory component of the network element. In some examples, the classification policy is stored in memory of a computer processing component (e.g., an ASIC) of the network element. The classification policy includes information that can be used to classify the data flows. In some implementation, the information includes one or more classifiers. In some implementations, the classification policy is implemented in a lookup table that includes thresholds relating to certain parameters which are calculated from some of the packets of each data flow, in accordance with the classification policy. When a classification policy has one or more classifiers, the network element can select one of the classifiers to classify the data flows. A particular classifier can be selected and then used for a period of time (e.g., minutes, hours, or days, etc.), where the selection can be based on information from the data center, the time of day, or the day of the week, a user input, or based on other input provided to the network element.

Figure 8:
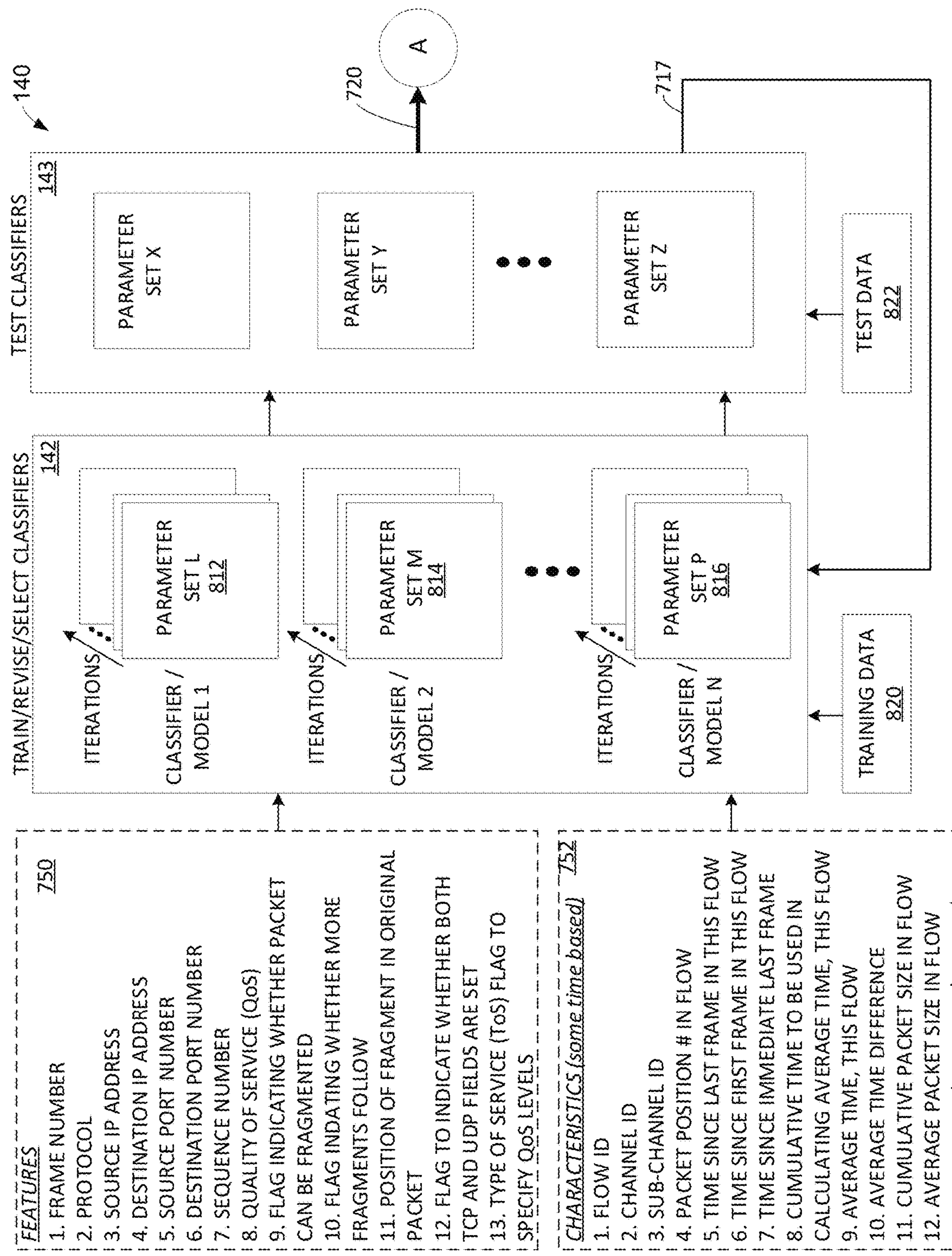
FIG. 8 is a schematic further illustrating an example of determining one or more algorithms to use to classify data flows from a particular data center or other network, or network element, using one or more features from the data flow and/or one or more characteristics (some time-based) of the data flows.

The classification policy is determined "offline," that is, determined separate from the operations of classifying the data flows. Historical packets 135 that were previously transmitted on a network of the data center 100 can be communicated 134 to a classification policy generation system 140. To generate the classification policy, the historical packets are grouped into their respective data flows, numerous parameters (for example, as illustrated in FIG. 8) are calculated for each data flow, and the actual type of each data flow is determined in a calculations portion 141 of the classification policy generation process. The actual type of each data flow is used as "ground truth" for subsequent training and testing of classifiers. In a training portion 142 of the classification policy generation process, one or more classifiers are trained to classify data flows based on one or more of the parameters using a training portion of the historical packets. Then in a testing portion 143 of the classification policy generation process, the trained classifiers are tested using a test portion of the historical packets to determine an accuracy of the classifiers. Further training and testing may to be performed iteratively until the accuracy of classifiers is optimized. The classification policy is then communicated to the data center and stored to be used in real-time data flow classification operations. In an implementation where a classification policy includes more than on classifier, in some instances a separate system can keep track of the accuracy of the classifier, and if below a certain level, the system can switch to another classifier. Or, the system can be programmed to use a certain classifier at certain times or at certain points in the data network.

After a data flow is classified at block 125, data center network may perform one or more actions based on the data flow classification. For example, routing certain classifications of data flows to different channels, routing long data flows to dedicated links, etc. At block 130 the data center completes processing the data flow communicating the packets associated with the data flow to its intended destination. Several techniques currently utilized at data centers may be useful in applications of the present invention. For example, packet header data are generally available from common monitoring methods such as NetFlow, SFlow, or other commercial monitoring software platforms. The system creates tables of packet timestamps (if timestamps are available) and predetermined packet header fields and groups packets into data flows as indicated in FIGS. 4A and 4B. If two packets of a flow data are separated by more than a predefined time-period, each may be assigned to a different field and get its own flow ID number. Similarly, SYN and FIN flags may be used to split unique data flows.

Figure 1B:
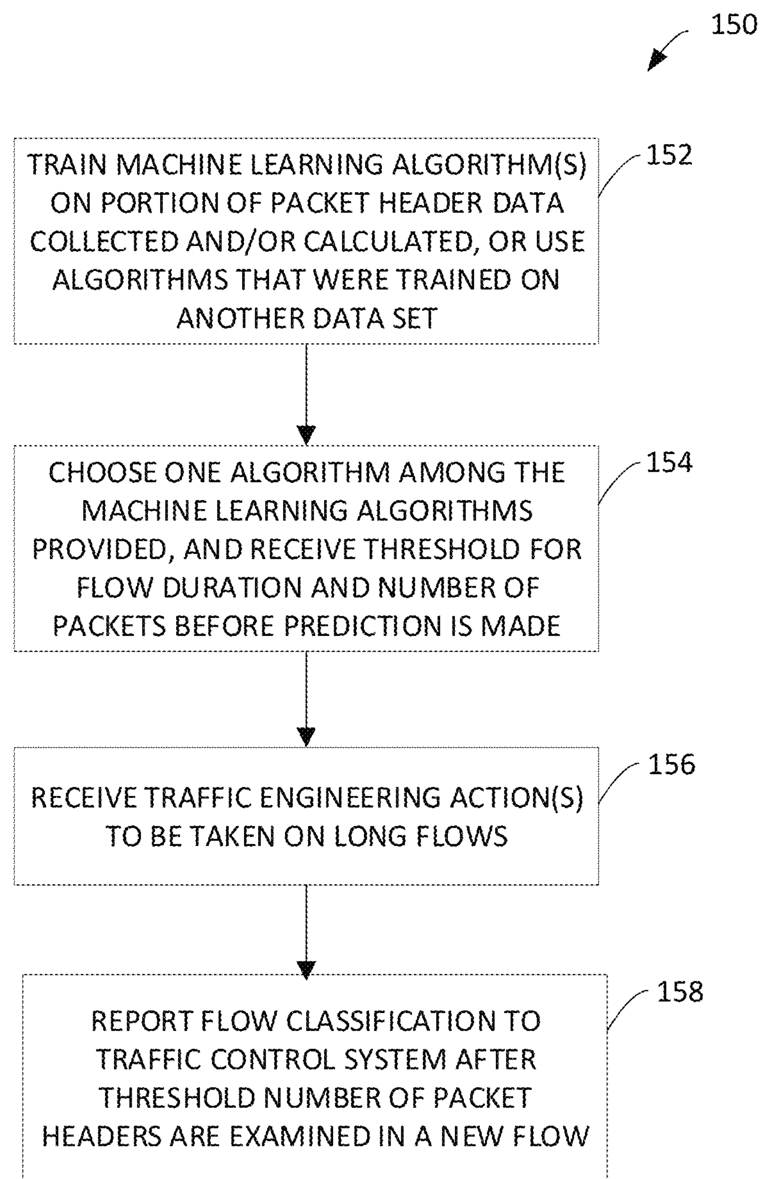
FIG. 1B is a flow diagram illustrating an example of a high level process for determining processes to use for classifying data flows and taking systems actions on long flows.

FIG. 1B is a flow diagram illustrating an example of a high level process 150 for determining processes to use for training classifiers of a classification policy, selecting an algorithm for classifying data flows, taking systems actions on long flows, and classifying data flows. This process can be implemented on a network (for example, in a data center on a network element. using the techniques described herein. At block 152, the process 150 trains one or more machine learning algorithms on portions of packet header data that was collected as sample data from a network, or uses algorithms that were trained on another data set. Block 152 can be performed in a non-operational training environment, for example, outside of the data center due to the extensive time it takes for training to occur. After the classification policy with the trained machine learning algorithms have been installed, or are otherwise accessible by a data center, at block 154 the method 150 selects an algorithm among the machine learning algorithms, and receives input of a threshold for flow duration in a number of packets before a predictions made as inputs to the machine learning algorithm. At block 156, the method 150 receives in input indicating one or more traffic actions to be taken for data flows identified as being a long data flow. Finally, at block 158, the method 150 reports data flow classification to a traffic control system after a threshold number of packets are examined for a newly received data flow.

Figure 2:
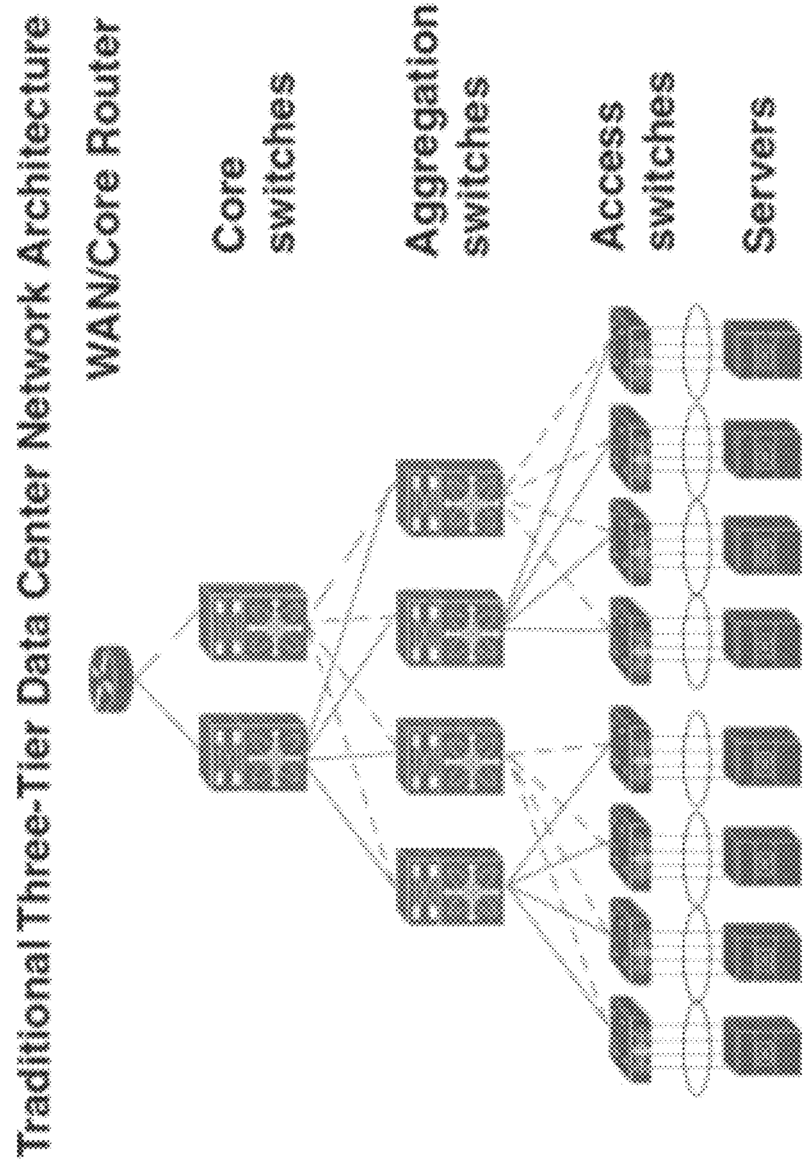
FIG. 2 illustrates an example of a fat-tree architecture of a data center in which embodiments of the invention can be implemented.

FIG. 2 illustrates an example of a fat-tree architecture of a data center in which embodiments of the invention can be implemented. The fat tree network is a universal network for efficient communication. In a tree data structure, every branch has the same thickness, regardless of their place in the hierarchy—they are all "skinny" (skinny in this context means low-bandwidth). In a fat tree, branches nearer the top of the hierarchy are "fatter" (thicker) than branches further down the hierarchy. In a telecommunications network, the branches are data links; the varied thickness (bandwidth) of the data links allows for more efficient and technology-specific use. The Fat Tree architecture can include three levels of switching, i.e., Top of Rack (ToR), Aggregation and Core, and generally allows more connectivity among hosts.

Figure 3:
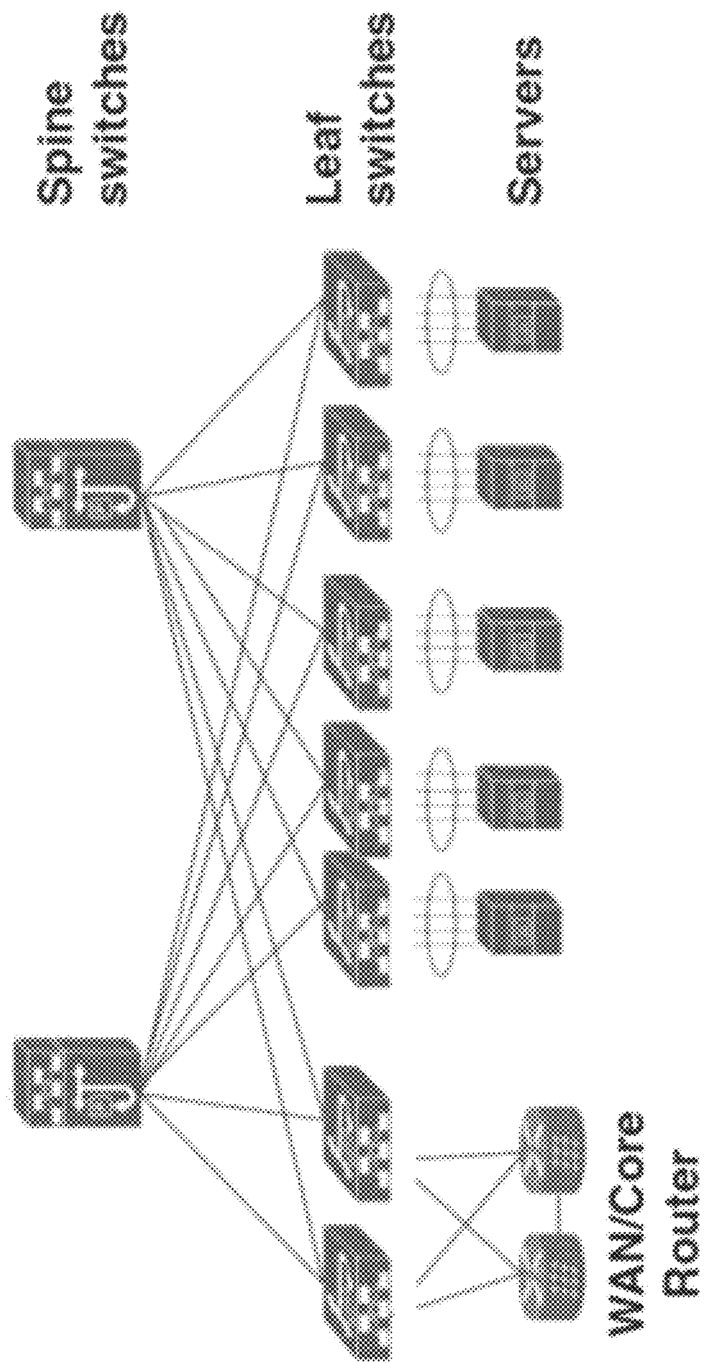
FIG. 3 illustrates an example of a spine-leaf architecture of a data center in which embodiments of the invention may be implemented.

FIG. 3 illustrates an example of a Spine-Leaf architecture of a data center in which embodiments of the invention may be implemented. The Spine-Leaf architecture has each spine switch connected to each leaf/ToR switch and generally allows ease of expansion, such as adding more data processing equipment over time. With spine-leaf configurations, all devices are exactly the same number of segments away and contain a predictable and consistent amount of delay or latency for traveling information. This is possible because of the new topology design that has only two layers, the Spine layer and Leaf layer. The Spine layer (made up of switches that perform routing) is the backbone of the network, where every Leaf switch is interconnected with each and every Spine switch.

Fat-Tree networks and Spine-Leaf networks are two data center architectures whose network/network elements can benefit from the advantages of the embodiments of the invention, other data center architectures can also benefit. While Fat-Tree and Spine-Leaf architectures are most common, there are many other data center and high-performance computing (HPC) architectures, as well as other network architectures (such as those in a network operated by an Internet Service Provider (ISP) that can benefit from the advantages of the embodiments of the invention.

FIG. 4A is a table illustrating a portion of a "packet capture" file, showing packet numbers and information relating to the packets, including the 5-tuple data of the packets. The information in this table represents packet information that may be determined from packets received by the data center 100 in FIG. 1A, and which can be used to identify discrete data flows, where "like" packets are grouped into an individual data flow. In this example, the table in FIG. 4A shows packet information for six packets, packets 100-105, but is representative of the billions of packets a data center may receive. The table includes for each of packets 100-105 its 5-tuple values which are a set of five different values that include a source IP address/port number, destination IP address/port number and the protocol in use. The table also includes a packet designator (100-105). The time the packet was received, and the packet length. Packets are determined to be part the same data flow when they have the same 5-tuple information. In this example, packets 100, 102, 103, and 104 have the same 5-tuple information, which indicates the part of the same data flow. Packets 101 and 105 have the same 5-tuple information, which indicates they are part of the same data flow, different from the data flow that includes packets 100, 102, 103, and 104. If two packets of a flow are separated by more than a predetermined time period, each may be assigned to different flow get its own flow number. Similarly, STN and FIN flags may be used to split unique data flows into separate flows.

FIG. 4B is a table illustrating an example of the packets being assigned to individual flows. For example, packets 100, 102, 103, and 104 are assigned a Flow ID of "1." Packets 101 and 105 are assigned a Flow ID of "2." Processes that perform the determination of the 5-tuple information for a stream of packets in group the packets into individual data flows can be used by the data center 100 to identify individual data flows 110 (FIG. 1), which then can be classified to be a certain type of data flow (e.g., elephant or mice flow; category 1 (short), category 2 (medium), category 3 (long), etc.) as desired by the implementation.

Figure 4C:
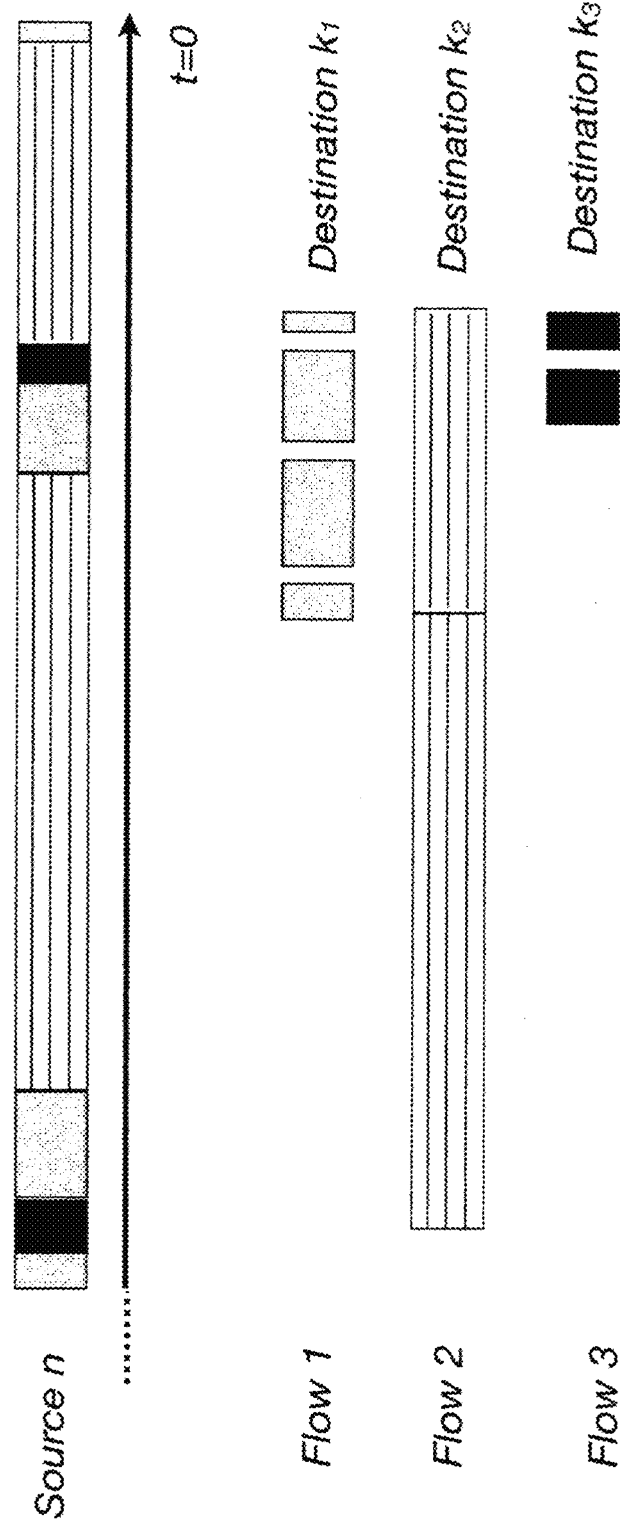
FIG. 4C illustrates an example of data flows (each segment of a flow consisting of a varying number of packets) transmitted in a data center or other network, or by a number of network elements, showing that some are short flows ("mice flows") and some are long flows ("elephant flows").

FIG. 4C illustrates an example of data flows (each segment of a flow consisting of a varying number of packets) transmitted in a data center or other network, or by a number of network elements, showing that some are short flows ("mice flows") and some are long flows ("elephant flows"). The flows from one source may go to different destinations. Each flow is comprised of a varying number of successive packets, with each packet typically carrying a varying amount of payload data (in number of bytes). In the illustration, Flow 1 and Flow 3 may be mice flows if the total duration or the total payload of the flow is less than a certain threshold, and Flow 2 may be an elephant flow if the total duration or the payload of flow exceeds a given threshold. Mice flows generally have latency sensitivity, with the quality of experience of the user matters the most; for example, in online retail, search, some Internet of Things (IoT) traffic, interactive video, and the like. Elephant flows generally have less sensitivity to latency, and can include backup, migration, downloads, and the like.

Figure 5:
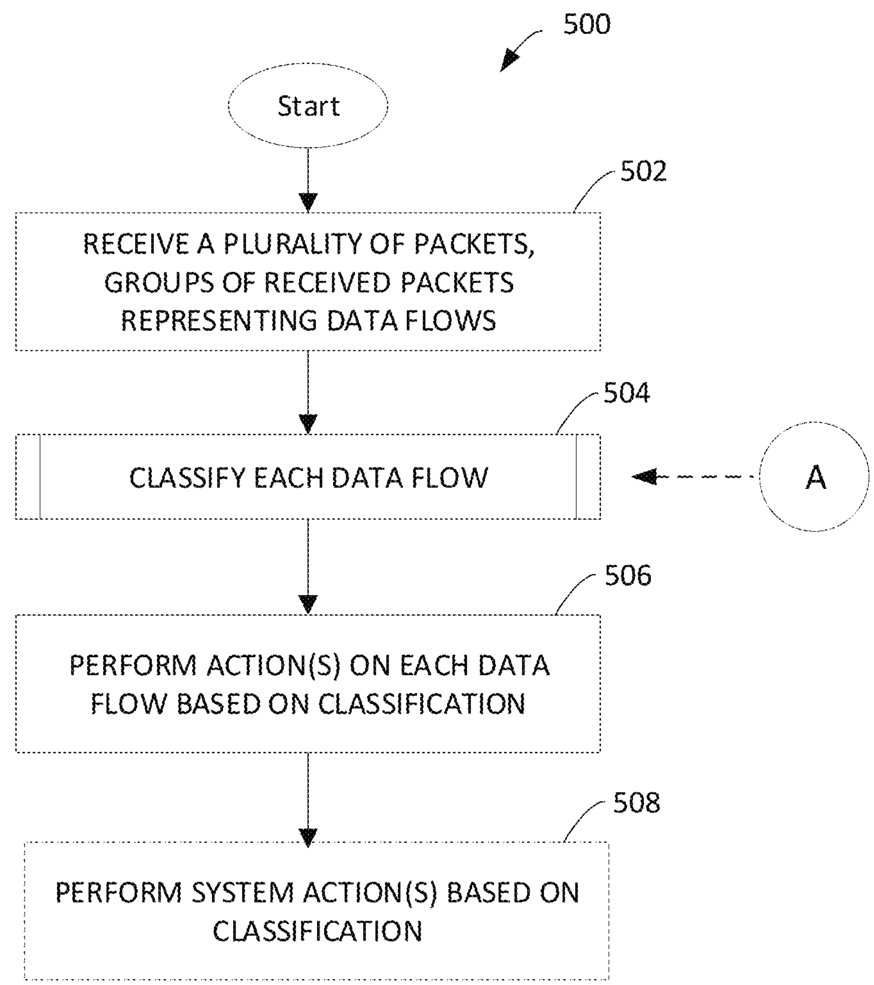
FIG. 5 is a flow diagram illustrating an example of a process for classifying data flows and performing actions on each data flow based on its classification, and further that one or more actions can also be performed based on the classification.
Figure 6:
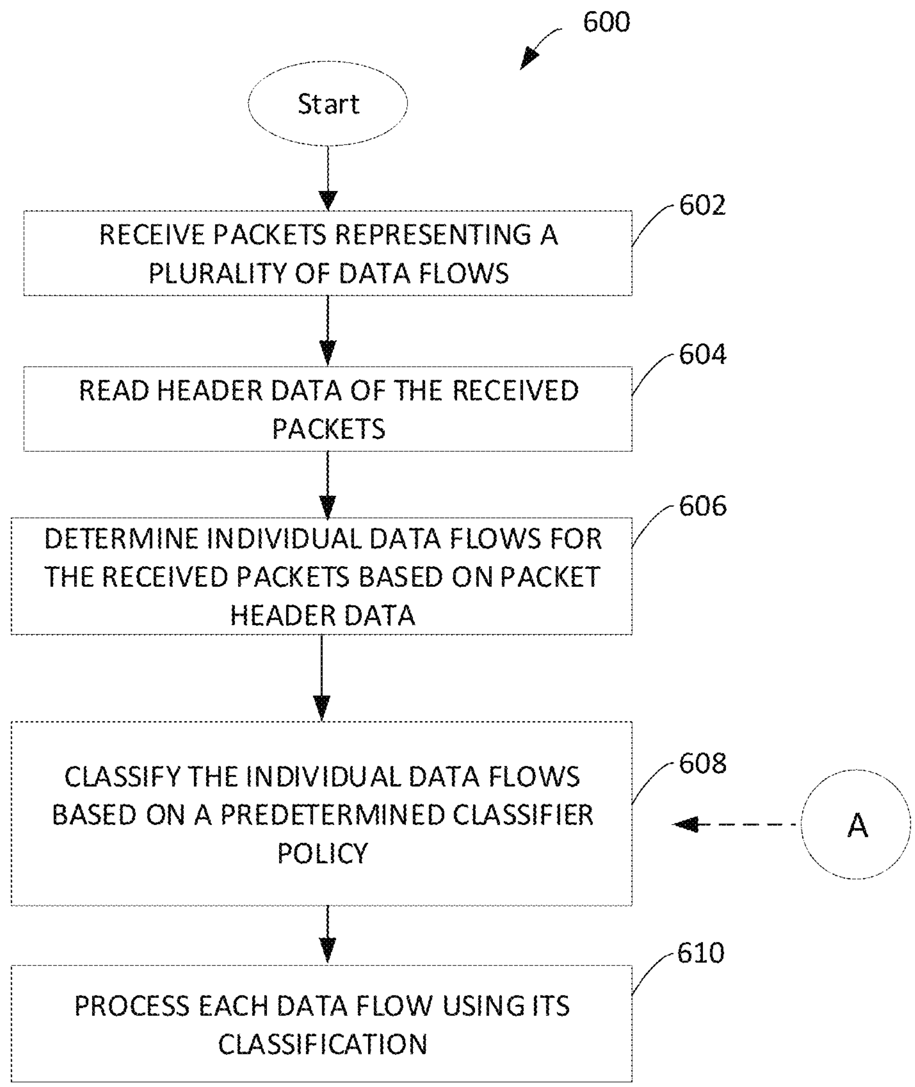
FIG. 6 is a flow diagram illustrating an example of a process for classifying the data flow and processing each data flow using its classification.
Figure 7:
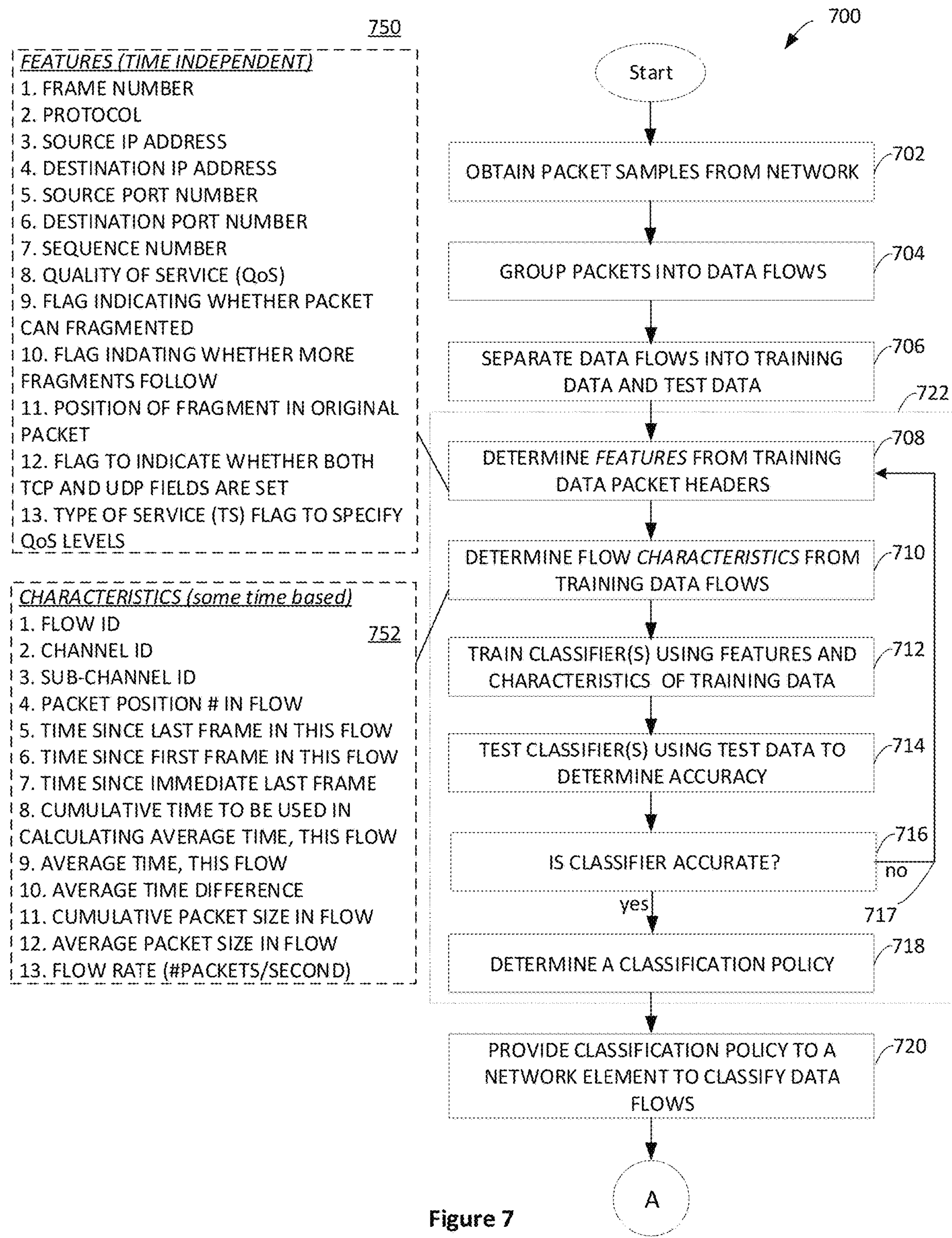
FIG. 7 is a flow diagram illustrating an example of determining one or more algorithms to use to classify data flows from a particular data center or other network, or network element(s), using one or more features from the data flow and/or one or more characteristics (some time-based) of the data flows.

FIG. 5 is a flow diagram illustrating an example of a high level process 500 for classifying data flows and performing actions on each data flow based on its classification, and further that one or more actions can also be performed based on the classification. Such a process can be performed in the data center 100 illustrated in FIG. 1, which may have, for example, a fat-tree or spline-leaf architecture as illustrated in FIGS. 2 and 3, respectively. FIGS. 6-8 provide additional details of processing/actions that may be included in process 500. At block 502, process 500 receives a plurality of packets where groups of the packets represent individual data flows. Using the packets 5-tuple information, the packets can be grouped into individual data flows and can be assigned a flow ID, as described in reference to FIGS. 4A and 4B.

At block 504, the process 500 classifies each data flow in real-time using a predetermined classification policy that is accessible to the process 500. For example, if process 500 is being performed within a single chip (e.g., an ASIC), or a set of chips, the classification policy may be stored in a non-transitory computer medium within the chip, or accessible by the chip, as represented by the circle "A." The classification of each data flow is a prediction of whether that data flow will last a long time or short time (when the data flow is being classified into two categories). The classification of a data flow is based on packet header information, and not DPI. The classification of data flow is independent of the transfer protocol (e.g., TCP/IP, UDP, etc.). Using the classification policy, it data flow can be accurately classified using only a few of the packets in the data flow. In some instances, 2 packets of a data flow are used. In other instances, 3 packets, 4 packets, 5 packets, 6 packets, 7 packets, 8 packets, 9 packets, or 10 packets can be used to classify each data flow.

The classification policy includes at least one classifier that has information to classify the data flows into categories. For example, into two categories (e.g., elephant or mice flows), three categories, (e.g., category 1/short, category 2/medium, category 3/long), four categories (category 1/short, category 2/medium, category 3/long, category 4/very long), or more than four categories (category 1, category 2, category 3, category 4, category 5, . . . , category n), as desired or required by the implementation. The classification policy can include more than one classifier (e.g., two classifiers or three classifiers). When the classification policy includes more than one classifier, each classifier may be optimized to accurately classify a different type of traffic flow data, for example, traffic flow data that includes a different percentage of length of data flows, or different lengths of data flows. In some examples, the process 500 can select a classifier from the classification policy to use to classify the data flows based on, for example, an input it receives indicating a system condition, or based on the time of day or the date. Each classifier has been trained (configured or structured) to classify data flows using certain parameters determined from a subset of the packets in the data flow being classified, which is further described in reference to FIGS. 7 and 8.

After a data flow is classified, at block 506 the process 500 performs an action on the data flow based on the classification (label). For example, long flows can be diverted to circuit switched high-capacity paths, using photonic switches. In software defined environments, the data flow label can be used to modify the flow tables used by software defined controllers. Flows may need a flag set for moving to a different traffic engineering scheme or a load balancing scheme.

At block 508, the process 500 may perform one or more systems actions based on the classification of a data flow, or based on classifications of more than one data flow. Such actions can include assigning real-time quality of service (QoS) to flows. For example, as the packet is forwarded to its destination, the QoS field is re-written (or written for the first time, if the QoS field is blank) for higher priority. In some instances, such actions can include routing data flows to different channels. In some instances, such actions can include providing input to flow tables (SDN) that affect flow priority, determining how a data flow is transmitted in the network. Such actions can also include routing long data flows to dedicated links, for example, dedicated high speed links. Other actions can include routing long data flows to a photonic layer, for example, high-speed photonic switches. Other actions can include routing data flows to P2P wireless networks, adjust buffer settings (for example, the percent of buffer allocates to elephant flows could be a maximum of x % of the buffer, and adjusted as needed). Another action can include managing streaming parameters, for example, how much is streamed ahead of time (e.g., ahead of play). Another action can include managing compression, for example, deciding not to compress short flows, or only compressing flows likely to last more than a threshold. Another action can include providing input to data flow traffic engineering, for example, deciding to override ECMP for certain long flows, so large flows are not routed via multiple paths.

FIG. 6 is a flow diagram illustrating an example of a process 600 for classifying data flows and processing each data flow using its classification using the techniques described herein. Aspects of process 600 may be similar to those of process 500 for similar operations. Process 600 can be implemented in a data center, for example, on a network element.

Referring to FIG. 6, at block 602 the process 600 can receive a plurality of packets representing a plurality of different data flows. At block 604, the process 600 reads header data of the received packets (e.g., 5-tuple information) and can form a table or store the header data. At block 606, the process 600 determines individual data flows for the received packets based on packet header data. For example, as described in reference to FIGS. 4A and 4B. At block 608, process 600 classifies the individual data flows based on a predetermined classifier policy, using information determined from a small set of packets from each individual data flow (e.g., 2-10 packets). At block 610, the process 600 processes each data flow based on its classification, e.g., based on whether the data flow is a mice flow or an elephant flow.

FIG. 7 is a flow diagram illustrating an example process 700 of determining a classification policy that includes one or more classifiers to be used as part of a classification policy for classifying data flows on a particular network. In other words, process 700 generates a "predetermined" classification policy off-line from a network. While example illustrated in FIG. 7 is generally described in reference to classifying the data flows into two categories, it can just as easily be applied to classifying data flows into three categories, four categories, or five categories, or more. Once the classification policy has been generated, it can then be installed on the network to classify data flow. The process 700 may implement one or several of the techniques described herein relating to determining a configuration of a classifier and related to classifying data flows.

At block 702, process 700 obtain samples of packets that have been transmitted on a network. Because different networks can have significantly a different traffic flow of packets, the samples are obtained from the actual network on which the classification policy will be used. In other words, the samples obtained from actual (same) network that will use the classification policy allow a classifier in the classification policy to be tailored to be most accurate to classify the type of data flows that the network is processing in normal day-to-day operations. At block 704 the process 700 groups the packets into data flows (e.g., using 5-tuple information). If two packets of a flow are separated by more than a predetermined time period, each may be assigned to different flow get its own flow number. Similarly, SYN and FIN flags may be used to split unique data flows into separate flows. At block 706, the samples are separated into two groups, training data and test data. Because this processing is done off-line (that is, not an operational scenario or time is of the essence) the data flows can be evaluated to determine with accuracy the length of the data flow (e.g., whether it is a mice or elephant flow). For example, 80% of the samples may be placed into the training data group which is used to train machine learning algorithms of the classifiers, and the other 20% of the samples may be placed into the test data group to be used to test the effectiveness of the particular machine learning algorithms and the predictive accuracy. There are no flows in the training data group that are also in the test data group.

In portion 722 of the flow diagram the process 700 generates the classification policy, including determining/training classifiers that are used in the classification policy. Referring to FIG. 7, at block 708 the process 700 determines features from the training data packet headers, and at block 710 the process 700 determines flow characteristics from the training data flows. In these portions of the process, learning and testing parameters ("features" and "characteristics") are developed from packet header and flow data to permit these parameters to contribute to a determination of whether each particular flow is to be designated an elephant flow or mice flow. In this example, as illustrated in FIG. 7, to develop the learning and testing parameters, a set of "features" 750 are identified and directly extracted from packet headers. In this example 13 features are identified, these features include frame number, protocol, source IP address, destination IP address, source port number, destination port number, sequence number, quality of service (QoS), a flag indicting whether packet can be fragmented (e.g., don't fragment (DF) flag), flag indicting whether one of more fragments follow, position of fragment in original packet, a flag indicating whether both TCP and UDP fields are set, and a type of service (ToS) flag to specify Quality of Service levels.

Other characteristics of the data flows can also be determined some of which can be time-based characteristics. In this example, as illustrated in FIG. 7, 13 other "characteristics" 752 are determined, including flow ID, channel ID, sub-channel ID, packet position number in the flow, time since last frame in this flow, time since first frame in this flow, average time for this flow, average time difference, cumulative packet size in this flow, average packet size in this flow, or flow rate (e.g., in number of packets per second). In some embodiments, all 26 parameters listed above (and described above under "Terms") may be used in training and testing. Other embodiments may use a subset of these 26 parameters, or different parameters.

Process 700 and then proceeds to block 712 where it trains one or more classifiers using features and characteristics of the training data, as further described in reference to FIG. 8.

One example of train the classifier, a portion of the training data is used with the 26 parameters. Because the training data is "ground truth" the classifier is trained to recognize data flows having certain parameters of the 26 parameters as being a mice flow or an elephant flow. In normal real-time processing at a data center there is not enough time to determine all 26 parameters, nor is there enough time to use all of the packets (or a large number of the packets) of a data flow to predict the classification. Thus a goal during training can be to determine a subset of the 26 parameters that can be used to accurately predict the classification of a data flow using a few of the packets of the data flow. The parameters are evaluated to determine which parameters have the greatest influence on the accuracy of the classifier. In other words, the parameters can be evaluated to determine which of the parameters is most useful to correctly predict the correct classification of a data flow, using as small of a number of packets as possible from a data flow.

Determining a subset of the parameters to accurately predict the classification of the data flow can be done in many ways. In one example, many iterations of training may be performed each time removing one or more of the 26 parameters until there are only a small number of parameters being used (e.g., one or two parameters) in each iteration. In another example, information from a previously trained classifier can be used as a starting point which may reduce the number of parameters to train on if the data is similar. At block 714, after a classifier is trained the process 700 tests the classifier using the test data samples to determine the accuracy of the classifier. The testing of the classifier may include testing the accuracy of the classifier using a different number of packets from each data flow being tested to determine the number of packets that are sufficient to be evaluated to achieve the desired accuracy, or to determine a reasonable threshold number of packets to evaluate after which evaluated more packets does little to increase the accuracy of the classifier.

At block 716 the accuracy of the tested classifier is evaluated. In some instances a classifier is evaluated to determine if it is accurate enough while only processing a certain number of packets (e.g., to meet a throughput or "speed" requirement of the system). In some examples of this process, the classifiers are trained in a "four-fold" process. The classifiers are trained using a randomly selected portion of the training data set, and tested using a randomly selected portion of the testing data set. This process is then repeated four times (hence "four-fold"). The accuracy is averaged in the four cases and the best candidate algorithm is chosen to be applied in the production (real network) environment. If the accuracy or the speed of the classifier is not sufficient, process 700 can move back along line 717 to block 708 where the functionality in blocks 708, 710, 712, 714, and 716 is performed again and again. When the classifier is deemed to be "accurate" at block 718 it can be included in a classification policy. The classification policy may include one or more classifiers, any of which may be selected to classify data packets transmitted in the network.

At block 720, the process 700 provides a classification policy to a network element to classify data flows. Providing the classification policy may include storing the classification policy in a computer readable medium accessible to the network element classifying data flows.

The following additional features and concepts may be applied to embodiments of the present invention:

1) Flow duration classes may be used instead of flow labels.

2) Training may be performed in different modes:

A. In an example, the training is performed in one-shot, where all the available training data is used to learn a final set of classification rules. In such cases, re-learning may be repeated periodically based on information extracted in the previous period and by discarding the earlier rules and replacing them by the new rules, or B. In an example, additional training of a classifier is done "on-the-fly," where classification rules are updated as new data and labels become available. In such cases, the update can happen when a new flow is labelled or when many label flows are available, and the rules are updated as a batch.

3) The training data set may be obtained by splitting the entire data set into two sets: a training set and a test set. Splitting is done on a per-flow basis, i.e., all the packets belonging to a flow are kept in either only in the training set or the test set. Splitting is done randomly or pseudo randomly (based on a starting seed). Training and test set sizes (either in number of packets or number of flows) need not be equal. e.g., 80/20 split may be used.
4) It may be desirable (but not necessary) to keep the ratio of flow labels (short/long/etc.) the same in each set. This is achieved by (pseudo) randomly splitting each subset of flows sharing the same label according to the split percentage, e.g. 80/20. The training process may use all the packets in each flow or may be limited to use only the N packets (N being a user-specified value).
5) Once a machine learning algorithm is run on the training set to learn classification rules, then the algorithm is used on the test set to access the accuracy of the model predicting the correct flow labels. The assessment of accuracy may be based only on the first N packets in a flow, N being a user specified value. The assessment may be based on groupings of predicted and real labels, e.g. {very-short, short} vs {medium, long, very-long} groups.
6) In various examples of a classifier, the classifier may use a machine learning algorithm of various types, including, for example, a random-forest, decision-tree, support vector machine, k-means or neural network.
7) In some embodiments, a machine learning algorithm can be used as a predictor for the flow duration or for total payload in the flow (instead of the class labels derived thereof).
8) The flow labels extracted in real-time can be used a variety of ways for better traffic engineering, whether "better" means more efficient use of network resources or better routing of time-sensitive traffic or both.

FIG. 8 is a schematic further illustrating an example of aspects of a classification policy generator 140 that incorporates methods for determining one or more classifiers to use to classify data flows from a particular network using one or more parameters (features and/or characteristics). The aspects illustrated in FIG. 8 may be used, for example, in process 700 (FIG. 7). Although FIG. 8 illustrates one example of generating classifiers using training data and test data, and a number of parameters, other processes may also be used to train one or more classifiers (or models) to accurately classify a data flow to be a flow of a certain category, and then the classifiers can be used in the claims classification policy. Important aspects of the generating a classification policy disclosed herein, no matter what specific training methodology is used to select classifiers and to train the classifiers, include: pre-determining the classification policy, determining the classification policy using training data that includes actual data flows that were transmitted on the network where the classification policy will be used/implemented, using test data that includes actual data flows that were transmitted on the network with a classification policy will be used/implemented, determining which parameters from the numerous features and characteristics disclosed herein are the most important (have the most influence) for a particular classifier to have a high accuracy, and determining which parameters for the numerous features and characteristics disclosed herein are the most important for a particular classifier to be able to accurately classify data flows using a small number of data packets (e.g., 2-10) during real-time operations on the network.

FIG. 8 shows a training portion 142 of the process where a set of one or more classifiers that may be included in a classification policy are selected, trained, and revised using the training data 820 group of samples, and a test portion 143 where the "trained" classifiers are tested using the test data 822 group of samples. One or more Features 750 and/or more or more Characteristics 752 may be input to the training portion 142 and used in various combinations in multiple iterations to optimize accuracy of the classifiers. In the training portion 142 one or more classifiers (or model) may be selected for training. For example, classifier/model 1, classifier/model 2 . . . classifier/model N. Each classifier may be based on a different model of machine learning, for example, a random-forest, a decision-tree, a support vector machine, k-nearest neighbor, or a neural network. Different classifiers may be included in the training portion 142 because different ones of the various classifiers may have a higher performance based on the type of data transmitted through a network that is represented in the training data 820, and the only way to determine which one is better for that particular type of data is through the a training and testing process.

In one example of training a classifier, for each classifier/model a set of parameters can be iteratively selected and the classifier/model is trained to classify data packets of the training data 820. For example, for classifier/model 1 parameter set L 812 is selected as a starting set for training, for classifier/model 2 parameter set L 814 is selected, and for classifier/model N parameter set P 816 is selected. The parameter sets selected for each of the different classifier/models may be (initially) different or the same. For each classifier, varying parameter sets can be used to train the classifier and determine which of the most important parameters for the data being trained on and for that particular classifier. The purpose of the training is to configure the classifier/model to be able to predict the classification of data flows in the training data 820 using only a small number of the parameters (e.g., as few as possible) and using only a few of the data packets (e.g., as few as possible) of a particular data flow. Because several classifier/model may be selected for testing, the large number of parameters that may be used for training, and the (potentially) thousands of data flows in the training data 820, a large number of iterations, the training portion 142 may take many hours to complete.

For each classifier being trained, once an optimized parameter set has been determined for the classifier and that particular training data 820, the classifiers are tested in the testing portion 143 using test data 822. For example, the optimized parameter set X was determined for classifier/model 1, the optimized parameter set Y was determined for classifier/model 2, and the optimized parameter set Z was determined for classifier/model N. using the same test data 822, each classifier can be used to predict if the data flows in the test data 822 are mice or elephant flows. The results of these classifications are compared with "ground truth" in the accuracy of each of the classifiers is determined. If a performance metric the classifiers is deemed to be below the threshold, the process may loop back 717 to the training portion 142 additional training of the classifiers, which may involve revising the parameters that are used for the classifier predictions. In various embodiments, the performance metric may be that the accuracy of the classifiers is too low, the speed of the classifiers is too slow, or too many packets are needed to make accurate enough predictions (which may also be an indication that the speed of the classifiers to slow). Once a classification policy has been determined it can be provided 720 to a network element the processes data packets on the network from which the training data in the test data came from.

The information in the classification policy may be implemented in various forms. For example, if the selected one or more classifiers of a classification policy are fast enough to perform real-time operational data flow classifications, the classifiers themselves (or portions thereof) can be implemented to perform the data flow classification. In some examples, a classifier may determine that only a small subset (e.g., 1, 2, 3, 4, 5, or 6) of parameters need to be calculated to accurately classify a particular type of data on a network. In such cases, the classification policy may only include instructions to calculate the small subset of parameters in any thresholds associated with determining the classification of the data flow based on the calculation of the parameters. In one example, a classifier may determine that only a single parameter is needed to be calculated, and the cancellation policy will be to calculate that parameter and it determine the classification of the data flow based on a threshold associate. For example, in some instances the single parameter may be the flow rate, the time since first frame in this flow, the time since last frame in this flow, etc.).

Figure 9:
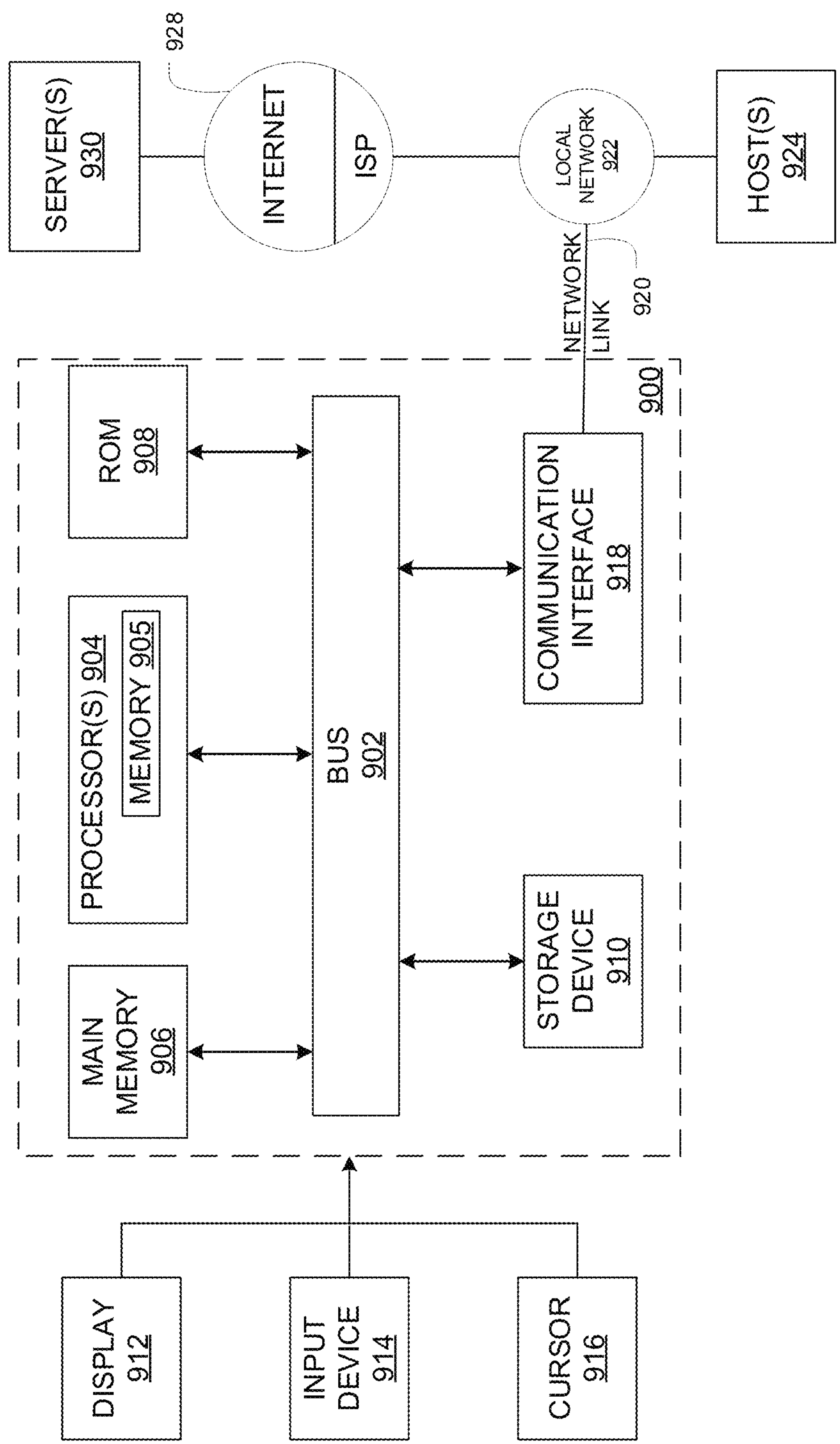
FIG. 9 is an example of a computer system that may be used to implement the functionality described herein.

FIG. 9 is an example of a computer system that may be used to implement the classification functionality described herein. Computer system 900 can be, or be part of, a network or a network element, for example, in a data center. Computer system 900 can include a bus 902 or other communication mechanism for communicating information, and a hardware processor, or multiple processors, 904 coupled with bus 902 for processing information. Hardware processor(s) 904 may be, for example, one or more general purpose microprocessors. The hardware processor(s) 904 include memory 905. In some examples, the functionality the components illustrated in the computer system 900 can be implemented in a single chip (e.g., an ASIC) and the classification policy is stored in memory and/or in circuitry, for example, memory 905.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, including on memory 905 integrated on a processor chip, render computer system 900 into a special-purpose machine that is customized to perform the operations specified in the instructions. Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a network operator. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912 by a network operator.

Computing system 900 may include a user interface module to implement a GUI that may be stored in a mass storage device as computer executable program instructions that are executed by the computing device(s). Computer system 900 may, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media. Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In various embodiments certain functionality may be accessible by a user through a web-based viewer (such as a web browser), or other suitable software program), and the user can install a predetermined classification policy, or update a predetermined classification policy, using these means. In such implementations, the user interface may be generated by a server computing system and transmitted to a web browser of the user (e.g., running on the user's computing system 900). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 10:
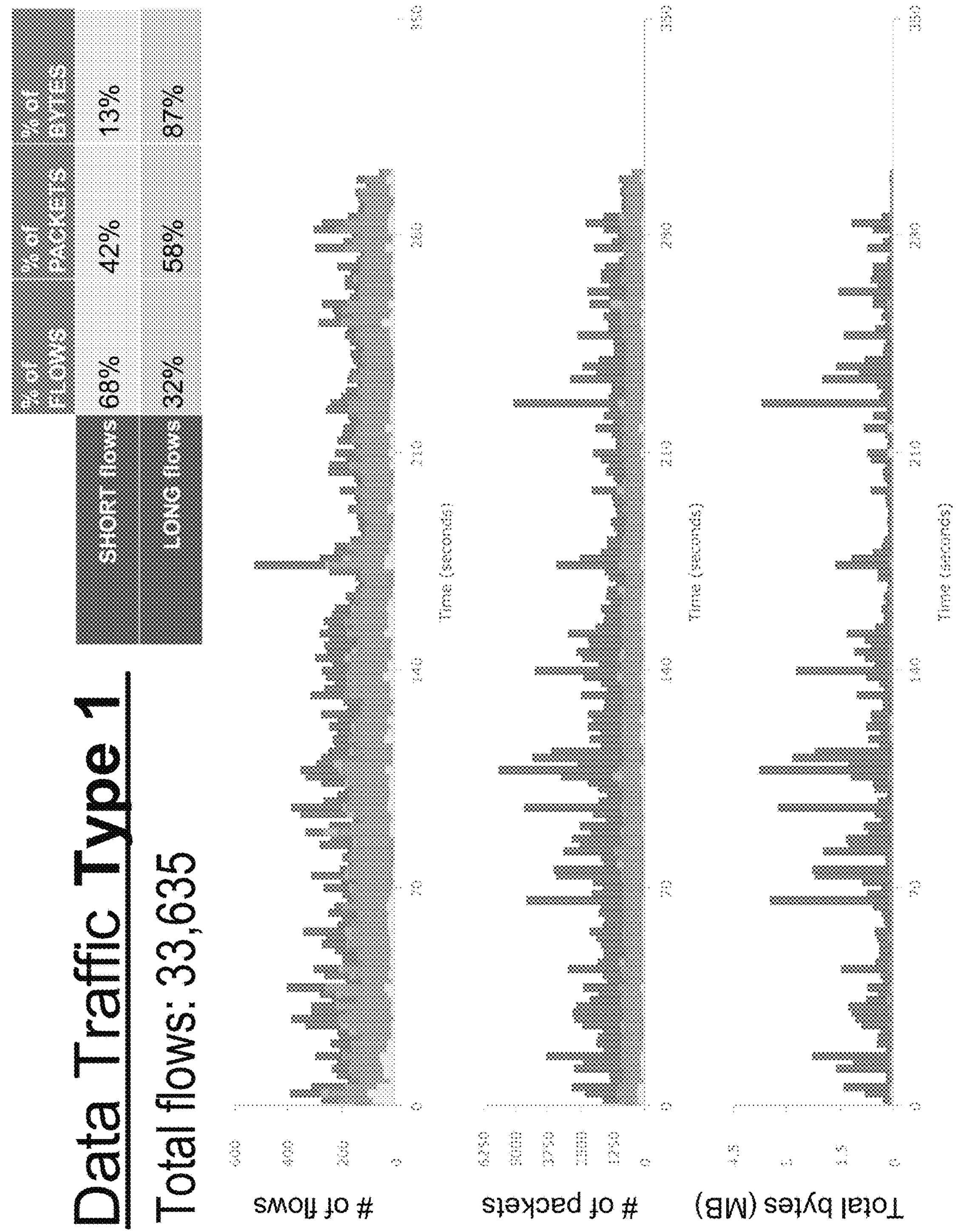
FIG. 10 illustrates an example of data traffic of a first type that may be transmitted in data center or other network, or network element, according to some embodiments. This example of data traffic can be used to determine a system/processes to classify data flows as described herein.
Figure 11:
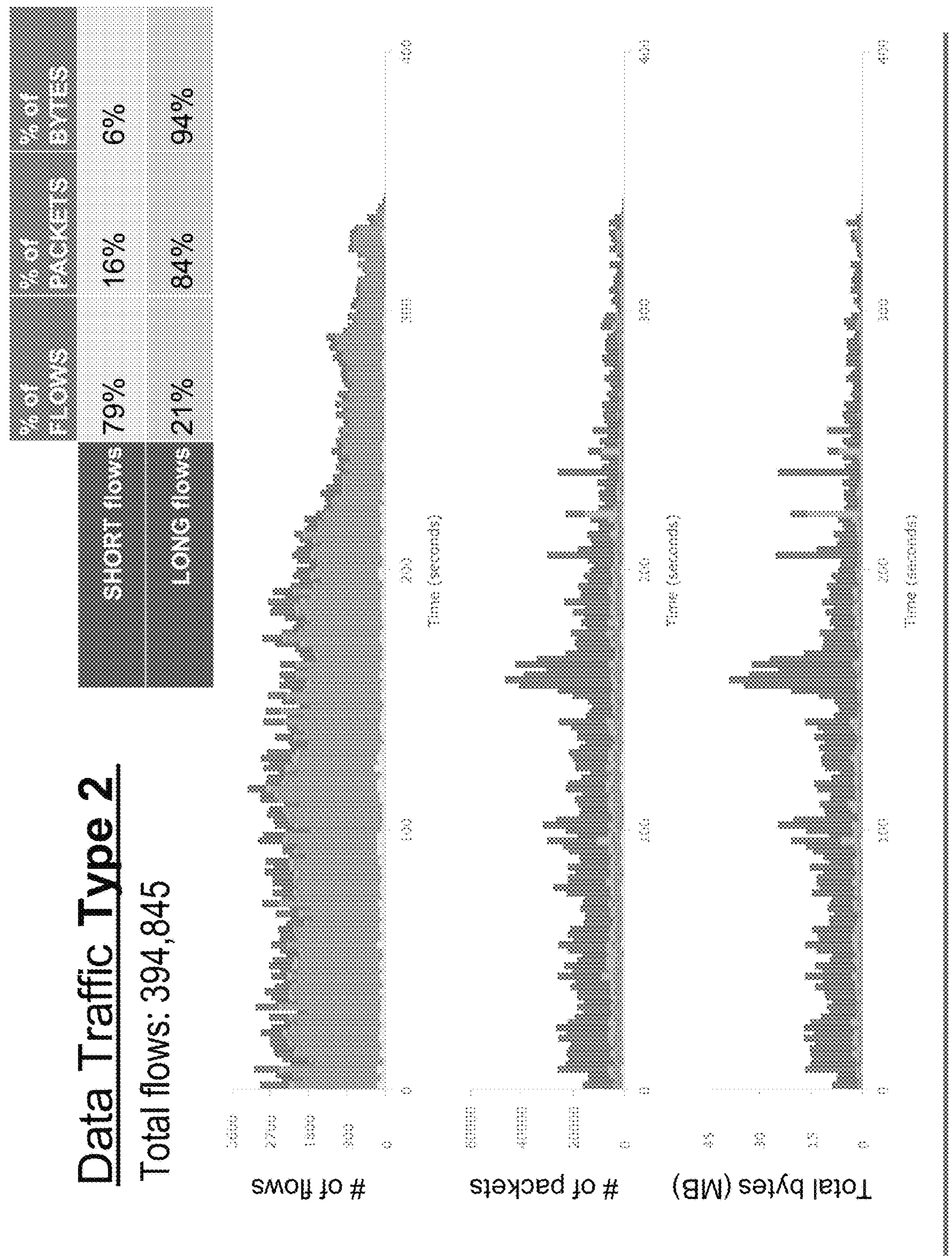
FIG. 11 illustrates an example of data traffic of a second type that may be transmitted in a data center or other network, or network element, according to some embodiments. This example of data traffic can be used to determine a system/processes to classify data flows as described herein.
Figure 12:
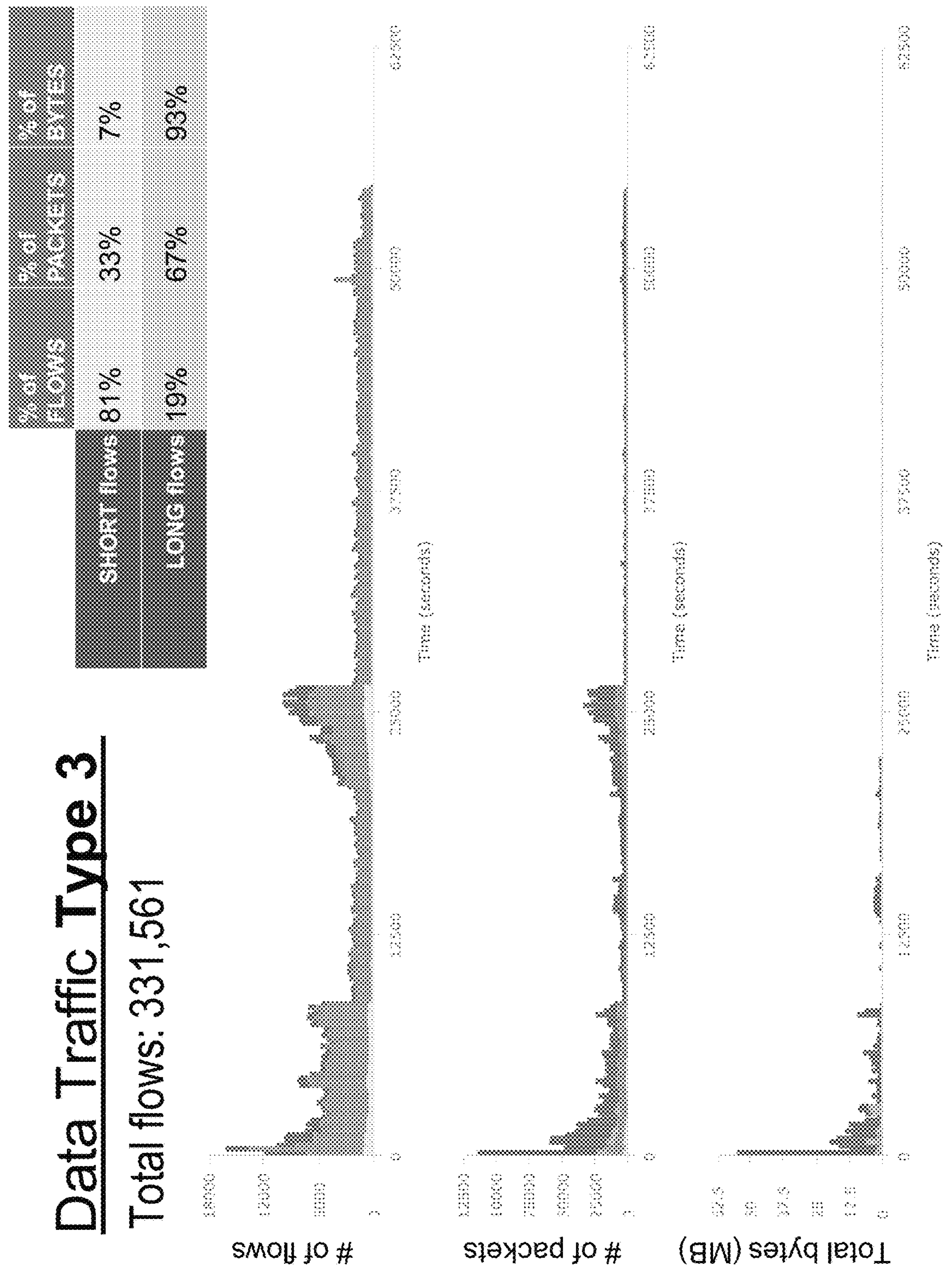
FIG. 12 illustrates an example of data traffic of a third type that may be transmitted in a data center or other network, or network element, according to some embodiments. This example of data traffic can be used to determine a system/processes to classify data flows as described herein.

FIGS. 10, 11, and 12 illustrate examples of data traffic of a first type, a second type, and a third type (respectively) that may be processed by a data center or other network, or network element, according to some embodiments. These examples of data traffic can be used to determine a system/processes to classify data flows, as described herein. Specifically, as shown in FIG. 10 for Type 1 data traffic of 33,635 flows, the lower bar graph shows the total bytes transmitted as a function of time. The middle graph shows the number of packets transmitted as a function of time. An upper graph shows the total number of flows transmitted as a function of time. For this Type 1 data traffic the short flows make up 60% of the flows, 42% of the packets, and 13% of the total bytes. The long flows make up 32% of the flows 58% of the packets and 87% of the total bytes transmitted. FIG. 11, for Type 2 data traffic having 394,845 flows, shows a lower graph showing the total bytes transmitted as a function of time, a middle graph showing the number of packets transmitted as a function of time, and an upper graph showing the total number of flows transmitted as a function of time. For this Type 2 data traffic the short flows make up 79% of the flows, 16% of the packets, and only 6% of the total bytes. The long flows make up 21% of the flows 84% of the packets and 94% of the total bytes transmitted. FIG. 12, for Type 3 data traffic having 331,561 flows, shows a lower graph showing the total bytes transmitted as a function of time, a middle graph showing the number of packets transmitted as a function of time, and an upper graph showing the total number of flows transmitted as a function of time. For this Type 3 data traffic the short flows make up 81% of the flows, 33% of the packets, and only 7% of the total bytes. The long flows make up 19% of the flows 67% of the packets and 93% of the total bytes transmitted.

Figure 13:
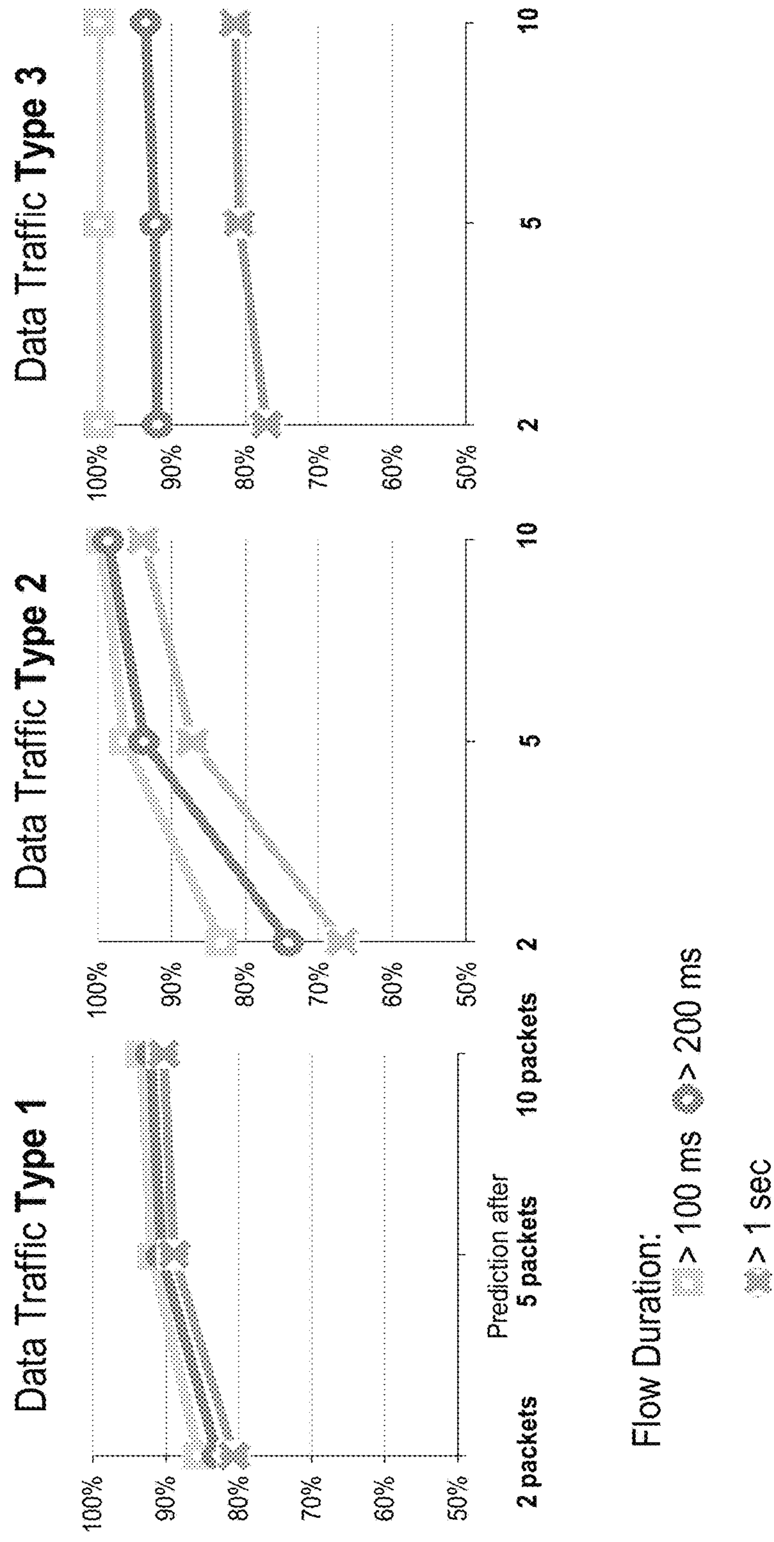
FIG. 13 illustrates an example of the different results that can be obtained for long flows using different algorithms for the three different data traffic types illustrated in FIGS. 10-12, according to some embodiments.
Figure 14:
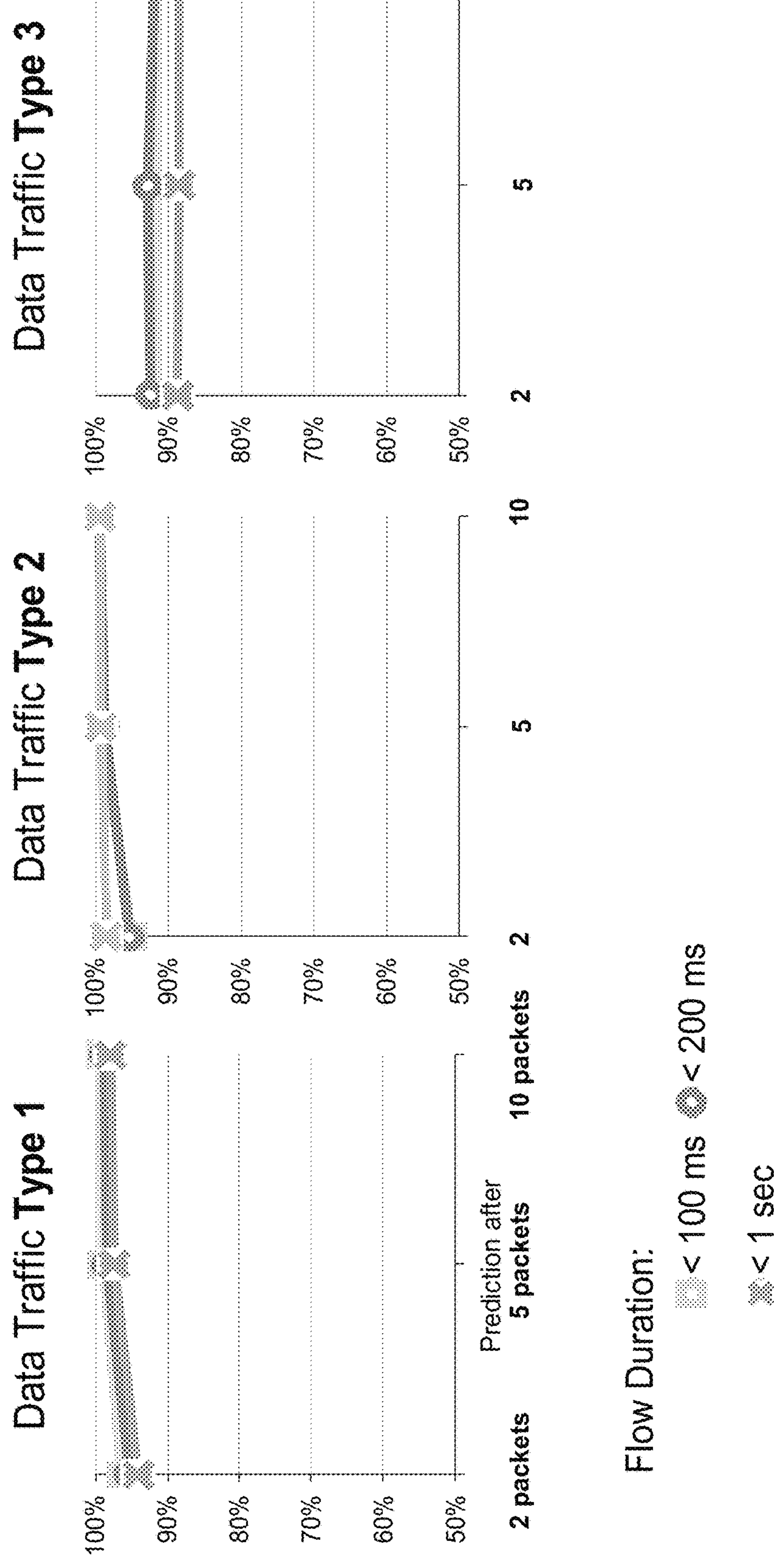
FIG. 14 illustrates an example of the different results that can be obtained for short flows using different algorithms for the three different data traffic types illustrated in FIGS. 10-12, according to some embodiments.

FIGS. 13 and 14 illustrate examples of the different results that can be obtained for long flows using different algorithms (classifiers) for the three different data traffic types illustrated in FIGS. 10-12. In FIG. 13 the plots show the prediction accuracy for long flows of the three different data types grouped into three different ranges, greater than 100 ms ("square"), greater than 200 ms ("circle") and greater than one second ("x"). In FIG. 14 the plots show the prediction accuracy for short flows of the three different data types grouped into three different ranges, less than 100 ms ("square"), less than 200 ms ("circle") and less than one second ("x").

FIG. 15 illustrates an example of different data accuracies for different classifiers (or algorithms) A, B, and C based on the data traffic Type 1, Type 2, and Type 3, and illustrates an example where the best classifier for one type of data may not be the best classifier for another type of data. The example classifiers A, B, and C were determined based on evaluating sample data from a particular network. In implementing a classification policy that includes one or several classifiers, due to the differences in the data traffic for any particular network, sample data from that particular network should be used to determine the best classifiers to use and which parameters to use for those classifiers.

In this example, the classifier C was determined to have the highest accuracy for classifying data flows for data traffic of Type 1 at 85.5%, classifier B was determined to have the highest accuracy for classifying data flows for data traffic of Type 2 at 83.3%, and classifier A was determined to have the highest accuracy for classifying data flows for traffic of Type 3 at 99.9%. However, if classifier C is selected to be used (because the data traffic is Type 1 and classifier C has the highest accuracy for Type 1 data), and the data type pattern changes to Type 2, the accuracy of the data flow classification decreases to 83.1%. If the data type pattern changes to Type 3, the accuracy of the data flow classification increases to 97.3%. The accuracy of classifiers B and C also change with the type of data traffic. The accuracy for classifier B increases to 84.8% for data traffic of Type 1, and to 84.4% for data traffic of Type 3. The accuracy for classifier C decreases from 99.9% for data traffic of Type 3 to 76.8% for data traffic of Type 1, and to 71.3% for data traffic of Type 2.

Accordingly, it may be advantageous to have a classification policy that includes multiple classifiers that can be selected for classifying data flows based on certain criteria. Using the example above, if it is determined that the data traffic on a network is Type 1, classifier C should be selected. If the data traffic changes to Type 2, classifier B should be selected. And if the data traffic changes to Type 3, classifier C should be selected. In some embodiments, other processes on the network can be used to monitor the data traffic to determine what type of data traffic the network is experiencing, and this information can be used to select a particular classifier in a classification policy to best handle the data traffic being experienced at that time.

Examples of Certain Embodiments

Embodiment A is a method of classifying data flows being communicated on a network by one or more network element(s), the method comprising: receiving a plurality of packets from the network, each packet having header information; segregating the plurality of packets into a plurality of data flows based at least in part on the respective header information of each packet; for each data flow: selecting a subset of the packets in the respective data flow; classifying by a network element the data flow as one of at least two categories of data flows using one or more parameters determined from the subset of packets and using a predetermined classification policy for classifying data flows, said classification policy including one or more classifiers each defined using parameters determined from packets in a plurality of sample data flows, the sample data flows being previously transmitted on the network; and routing the data flow in the network based on its respective classification.

Embodiment B includes Embodiment A, wherein the number of sample data flows is greater than one hundred thousand data flows. Embodiment C includes Embodiment A, wherein the number of sample data flows is greater than ten thousand data flows. Embodiment D includes any one of Embodiments A-C, further comprising storing the predetermined classification policy on the network element. Embodiment E includes any one of Embodiments A-E, further comprising generating the predetermined classification policy. Embodiment F includes Embodiment E, wherein generating the predetermined classification policy comprises obtaining samples of packets previously transmitted on the network; grouping the samples of packets into data flows; separating the data flows into training data and test data; determining one or more parameters from the training data; training one or more classifiers using the one or more parameters of the training data; testing the one or more classifiers using the test data to determine an accuracy of each classifier; determining if each classifier is accurate, and in response to determining a classifier is not accurate, repeating parts (v)-(vi) of the method; and providing the classification policy including the one or more classifiers to the network element. Embodiment G includes any one of Embodiments A-F, wherein the one or more parameters includes one of more features, each feature being a time-independent feature determined using respective packet information in a data flow. Embodiment H includes any one or Embodiments A-G, wherein the one or more features include at least one or the following: frame number, protocol, source IP address, destination IP address, source port number, destination port number, sequence number, quality of service (QoS), a flag indicting whether packet can be fragmented, flag indicting whether one of more fragments follow, position of fragment in original packet, a flag indicating whether both TCP and UDP fields are set, or a type of service (ToS) flag to specify Quality of Service levels. Embodiment I includes any one of Embodiments A-H, wherein the one or more parameters includes one of more characteristics. Embodiment J includes Embodiment I, wherein the one or more characteristics includes time-based characteristics that are calculated using respective packet information in a data flow. Embodiment K includes Embodiment I, wherein the one or more characteristics include at least one of the following: flow ID, channel ID, sub-channel ID, packet position number in the flow, time since last frame in this flow, time since first frame in this flow, average time for this flow, average time difference, cumulative packet size in this flow, average packet size in this flow, or flow rate. Embodiment L includes any one of Embodiments A-K, wherein the predetermined classification policy includes at least two classifiers. Embodiment M includes Embodiment L, further comprising selecting one of the at least two classifiers to classify data flows based on an input received by the network element. Embodiment N includes Embodiment M, wherein the input is based on a pre-set traffic engineering policy. Embodiment O includes Embodiment N, wherein the pre-set engineering policy dictates the use of a certain classifier based on the time of day or day of the week. Embodiment P includes any one of Embodiments A-O, wherein the predetermined classification policy includes three or more classifiers. Embodiment Q includes any one of Embodiments A-P, further comprising performing one or more network actions based on the classification of the data flows and the predetermined classification policy. Embodiment R includes Embodiment Q, wherein the one or more network actions include assigning real-time quality of service (QoS) to some or all flows. Embodiment 5 includes Embodiment Q, wherein the one or more network actions include routing data flows to different channels. Embodiment T includes Embodiment Q, wherein the one or more network actions include input to flow tables (SDN). Embodiment U includes Embodiment Q, wherein the one or more network actions include routing long data flows to dedicated links. Embodiment V includes Embodiment Q, wherein the one or more network actions include routing long data flows to photonic layer. Embodiment W includes Embodiment Q, wherein the one or more network actions include routing data flows to P2P wireless networks. Embodiment X includes Embodiment Q, wherein the one or more network actions include adjusting buffer settings. Embodiment Y includes Embodiment Q, wherein the one or more network actions include managing streaming parameters. Embodiment Z includes Embodiment Q, wherein the one or more network actions include managing compression. Embodiment AA includes Embodiment Q, wherein the one or more network actions include providing input to data flow traffic engineering. Embodiment AB includes Embodiment A, wherein said one or more parameters includes at least one of the following time independent features: frame number, protocol, source IP address, destination IP address, source port number, destination port number, sequence number, quality of service (QoS), a flag indicting whether packet can be fragmented, flag indicting whether one of more fragments follow, position of fragment in original packet, a flag indicating whether both TCP and UDP fields are set, or a type of service (ToS) flag to specify Quality of Service levels. Embodiment AC includes Embodiment A, wherein said one or more parameters includes at least one of the following characteristics: flow ID, channel ID, sub-channel ID, packet position number in the flow, time since last frame in this flow, time since first frame in this flow, average time for this flow, average time difference, cumulative packet size in this flow, average packet size in this flow, or flow rate. Embodiment AD includes any one of Embodiments A-AC, wherein segregating the plurality of packets into a plurality of data flows includes assigning packets having the same 5-tuple data in their header into the same data flow. Embodiment AD includes any one of Embodiments A-AC, wherein segregating the plurality of packets into a plurality of data flows includes separating packets into different data flows based at least in part on a predetermined time between two packets that have the same 5-tuple data.

Embodiment AF is a method of classifying data flows being communicated on a network by one or more network element(s), the method comprising: creating, from a plurality of sample packets, a table including information of packet timestamps and pre-defined packet header fields, the plurality of sample packets being previously transmitted on the network; grouping the plurality of sample packets into data flows based at least in part on information in the table; assigning flow identifiers to each of the data flows; grouping the data flows into a training portion and a testing portion; determining one or more parameters having one or more features and/or one or more characteristics of the training data flows; determining a classifier to predict flow labels, including iteratively training and testing the classifier, using the training portion and the one or more parameters to train each classifier, and the testing portion to determine an accuracy of the classifier; generating a classification policy that includes the classifier to classify data flows on the network; and providing the classification policy to be used by a network element to classify data flows. Embodiment AG includes Embodiment AF further comprising storing the classification policy in at least one non-transitory computer medium that is accessible by a network element that classifies data flows on the network.

Embodiment AH is a method of classifying data flows being communicated on a network by one or more network element(s), the method comprising: obtaining samples of packets from the network; grouping the samples of packets into data flows; separating the data flows into training data and test data; training one or more classifiers to classify data flows using one or more parameters of the training data and the training data as ground truth; determining accuracy or the one or more classifiers using the test data; in response to determining a classifier is not accurate, repeating portions (iv)-(v) of the method; and providing the classification policy including the one or more classifiers to be used to classify data flows on the network. Embodiment AI includes embodiment AH, further comprising storing the classification policy in at least one non-transitory computer medium that is accessible by the network element that is classifying data flows on the network. Embodiment AJ includes any one of Embodiments AH and AI, wherein generating a classifier for the classification policy comprises: determining an initial set of parameters including a plurality of features and a plurality of characteristics from the training data; using a selected classifier model and the initial set of parameters for respective data flows in the training data, classify the data flows in the training data to one of at least two categories of data flows and determine the accuracy of the classifications of the respective data flows using the test data; generating one or more revised sets of parameters by changing one or more of the features and characteristics of the initial set of parameters; using the selected classifier and the plurality of revised sets of parameters for respective data flows in the training data, classify the data flows in the training data to one of at least two categories of data flows and determine the respective accuracy of the classifier for classifying the data flows in the test data using each revised set of parameters; repeating steps (iii) and (iv) to improve the accuracy of the classifier to determine a final set of one or more parameters for the selected classifier, the final set of parameter being one of the revised sets of parameters; and including the selected classifier and the final set of parameters in the classification policy. Embodiment AK includes any one of Embodiments AH-AK, wherein the final set of one or more parameters provide the highest accuracy of the selected classifier to classify the test data within a certain period of time.

Embodiment AL is a system of generating a classification policy to classify data flows being communicated on a network by one or more network element(s), the system comprising: one or more non-transitory computer storage mediums configured to store at least: samples of packets that were previously transmitted on the network; and computer-executable instructions; one or more computer hardware processors in communication with the one or more non-transitory computer storage mediums, the one or more computer hardware processors configured to execute the computer-executable instructions to at least: group the samples of packets into data flows; separate the data flows into training data and test data; train one or more classifiers to classify data flows using one or more parameters of the training data and the training data as ground truth; determine accuracy or the one or more classifiers using the test data, and iteratively repeat portions (iii)-(iv) to improve the accuracy of the classifier.

System Implementation

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or nonvolatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of predicting, in real-time, the classification of data flows, at the beginning of each data flow, being communicated on a network by one or more network element(s), into categories based on a type of data flow, the type indicative of a time duration of the data flow or the payload of the data flow, the method comprising:

generating a classification policy for classifying data flows into categories based on the type of each data flow, including (i) obtaining samples of packets previously transmitted on the network, (ii) grouping the samples of packets into data flows based at least in part on the respective 5-tuple header information of each packet, (iii) separating the data flows into training data and test data, (iv) determining one or more parameters from the training data, (v) training classifiers to categorize the data flows in the training data into categories using the one or more parameters of the training data, each of the categories associated with data flows of different types, (vi) testing the classifiers using the data flows in the test data to determine an accuracy of each classifier, (vii) determining if each classifier is accurate, and in response to determining a classifier is not accurate, repeating parts (v)-(vi) of the method, and (viii) providing the classification policy including a classifier that was determined to be accurate to one or more network element(s), receiving a plurality of packets from the network, each packet having header information comprising a source IP address, a destination IP address, source port, destination port, and a type of transfer protocol;

once a number of the plurality of packets have been identified as belonging to a data flow based on the header information, for each data flow:

selecting a subset of ten or less packets in the data flow;

determining the one or more parameters from the subset of packets;

based on the determined parameters, predicting the classification, by a network element, of the data flow as one of at least two categories of data flows using the classification policy each of the at least two categories indicative of a different type of data flow; and routing the data flow in the network based on its respective category classification indicative of the duration of the data flow or the payload of the data flow.

2. The method of claim 1, wherein the number of sample data flows is greater than one hundred thousand data flows.

3. The method of claim 1, wherein the number of sample data flows is greater than ten thousand data flows.

4. The method of claim 1, further comprising storing the classification policy on a network element.

5. The method of claim 1, wherein the one or more parameters includes one of more features, each feature being a time-independent feature determined using respective packet information in a data flow.

6. The method of claim 5, wherein the one or more features include at least one or the following:

frame number, protocol, source IP address, destination IP address, source port number, destination port number, sequence number, quality of service (QoS), a flag indicating whether packet can be fragmented, flag indicating whether one of more fragments follow, position of fragment in original packet, a flag indicating whether both TCP and UDP fields are set, or a type of service (ToS) flag to specify Quality of Service levels.

7. The method of claim 1, wherein the one or more parameters includes one of more characteristics.

8. The method of claim 7, wherein the one or more characteristics includes time-based characteristics that are calculated using respective packet information in a data flow.

9. The method of claim 7, wherein the one or more characteristics include at least one of the following: flow ID, channel ID, sub-channel ID, packet position number in the flow, time since last frame in this flow, time since first frame in this flow, average time for this flow, average time difference, cumulative packet size in this flow, average packet size in this flow, or flow rate.

10. The method of claim 1, wherein the predetermined classification policy includes at least two classifiers.

11. The method of claim 1, further comprising performing one or more network actions based on the classification of the data flows and the predetermined classification policy.

12. The method of claim 11, wherein the one or more network actions include routing data flows to different channels.

13. The method of claim 11, wherein the one or more network actions include routing long data flows to dedicated links.

14. A method of classifying data flows, being communicated on a network by one or more network element(s), into categories based on a type of data flow, the type indicative of a time duration of the data flow or the payload of the data flow, the method comprising:

creating, from a plurality of sample packets, a table including information of packet timestamps and predefined packet header fields, the plurality of sample packets being previously transmitted on the network;

grouping the plurality of sample packets into data flows based at least in part on information in the table;

assigning flow identifiers to each of the data flows;

grouping the data flows into a training portion and a testing portion;

determining one or more parameters having one or more features and/or one or more characteristics of the training data flows;

determining a classifier to predict a type of data flow, including iteratively training and testing the classifier, using the training portion and the one or more parameters to train each classifier, and the testing portion to determine an accuracy of the classifier;

generating a classification policy that includes the classifier to classify data flows on the network using ten or less packets of a data flow; and providing the classification policy to a network element in the network to classify data flows.

15. The method of claim 14, further comprising storing the classification policy in at least one non-transitory computer medium that is accessible by a network element that classifies data flows on the network, and routing the data flow in the network based on its respective category classification indicative of the duration of the data flow or the payload of the data flow.

16. A method of classifying data flows being communicated on a network by one or more network element(s), into categories based on a type of data flow, the type indicative of a duration of the data flow or a payload of the data flow, the method comprising:

(i) obtaining samples of packets previously transmitted on the network;

(ii) grouping the samples of packets into data flows based at least in part on the respective 5-tuple header information of each packet;

(iii) separating the data flows into training data and test data;

(iv) training one or more classifiers to classify data flows into categories using one or more parameters of the training data and using the training data to recognize data flows that each of the categories is associated with data flows of a different type, (v) determining accuracy or the one or more classifiers using the test data;

(vi) in response to determining a classifier is not accurate, repeating portions (iv)-(v) of the method; and (vii) providing the classification policy to a network element to be used to classify data flows on the network using ten or less packets of a data flow to classify the data flow, the classification policy including a classifier that was determined to be accurate.

17. The method of claim 16, further comprising storing the classification policy in at least one non-transitory computer medium that is accessible by the network element that is classifying data flows on the network.

18. The method of claim 16, wherein generating a classifier for the classification policy comprises:

(i) determining an initial set of parameters including a plurality of features and a plurality of characteristics from the training data;

(ii) using a selected classifier model and the initial set of parameters for respective data flows in the training data, classify the data flows in the training data to one of at least two categories of data flows and determine the accuracy of the classifications of the respective data flows using the test data;

(iii) generating one or more revised sets of parameters by changing one or more of the features and characteristics of the initial set of parameters;

(iv) using the selected classifier and the plurality of revised sets of parameters for respective data flows in the training data, classify the data flows in the training data to one of at least two categories of data flows and determine the respective accuracy of the classifier for classifying the data flows in the test data using each revised set of parameters;

(v) repeating steps (iii) and (iv) to improve the accuracy of the classifier to determine a final set of one or more parameters for the selected classifier, the final set of parameter being one of the revised sets of parameters; and (vi) including the selected classifier and the final set of parameters in the classification policy.

19. The method of claim 1, wherein the type of the data flow is indicative of the duration of the data flow.

20. The method of claim 1, wherein the type of the date flow is indicative of the payload of the data flow.

* * * * *

UNITED STATES PATENT AND TRADEMARK OFFICE

CERTIFICATE OF CORRECTION

PATENT NO. : 10,855,604 B2
APPLICATION NO. : 16/694117
DATED : December 1, 2020
INVENTOR(S) : Hus Tigli It is certified that error appears in the above-identified patent and that said Letters Patent is hereby corrected as shown below:

In the Drawings

In sheet 9 of 17, FIG. 7, reference numeral 750, Line 12, delete "INDATING" and insert --INDICATING--.

In sheet 10 of 17, FIG. 8, reference numeral 750, Line 12, delete "INDATING" and insert --INDICATING--.

In the Specification

In Column 2, Line 66, delete "indicting" and insert --indicating--.

In Column 2, Line 67, delete "indicting" and insert --indicating--.

In Column 8, Line 33, delete "categories" and insert --categories.--.

In Column 9, Line 20, delete "date flows" and insert --data flows--.

In Column 11, Line 11, delete "indicting" and insert --indicating--.

In Column 11, Line 11, delete "indicting" and insert --indicating--.

In Column 21, Line 32, delete "indicting" and insert --indicating--.

In Column 21, Line 34, delete "indicting" and insert --indicating--.

In Column 24, Line 21, delete "the a" and insert --the--.

In Column 29, Line 39, delete "indicting" and insert --indicating--.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*

In Column 29, Line 40, delete “indicting” and insert --indicating--.

In Column 30, Line 7, delete “5” and insert --S--.

In Column 30, Line 32, delete “indicting” and insert --indicating--.

In Column 30, Line 33, delete “indicting” and insert --indicating--.

In the Claims

In Column 39, Line 8, Claim 20, delete “date” and insert --data--.